United States Patent
Padebettu

(10) Patent No.: US 12,089,271 B2
(45) Date of Patent: *Sep. 10, 2024

(54) UTILIZING A TRANSPORT PROTOCOL FOR FIFTH GENERATION (5G) CLIENT DEVICES TO CARRY MESSAGES ON WIRELINE ACCESS

(71) Applicant: Juniper Networks, Inc., Sunnyvale, CA (US)

(72) Inventor: Venkatesh Padebettu, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/309,936

(22) Filed: May 1, 2023

(65) Prior Publication Data

US 2023/0269796 A1 Aug. 24, 2023

Related U.S. Application Data

(63) Continuation of application No. 17/452,448, filed on Oct. 27, 2021, now Pat. No. 11,678,389, which is a
(Continued)

(51) Int. Cl.
*H04W 76/12* (2018.01)
*H04W 8/02* (2009.01)
(Continued)

(52) U.S. Cl.
CPC .............. *H04W 76/12* (2018.02); *H04W 8/02* (2013.01); *H04W 60/06* (2013.01); *H04W 76/15* (2018.02);
(Continued)

(58) Field of Classification Search
CPC ..... H04W 76/12; H04W 76/34; H04W 60/06; H04W 76/25; H04W 76/38; H04W 76/22;
(Continued)

(56) References Cited

U.S. PATENT DOCUMENTS 11,166,326 B2 11/2021 Padebettu
11,678,389 B2 * 6/2023 Padebettu ........... H04W 92/045
370/329
(Continued)

OTHER PUBLICATIONS

Pateromichelakis, Emmanouil, et al. "Service-tailored user-plane design framework and architecture considerations in 5G radio access networks." IEEE Access 5 (2017): 17089-17105 (Year: 2017).*

(Continued)

*Primary Examiner* — Sharad Rampuria
(74) *Attorney, Agent, or Firm* — Harrity & Harrity, LLP

(57) ABSTRACT

A device may utilize a point-to-point protocol over Ethernet (PPPoE) and a point-to-point protocol (PPP) to register the device with a core network, and may establish a first packet data unit (PDU) session with the core network based on the PPPoE and the PPP. The device may configure the first PDU session, based on the PPPoE and the PPP, to provide a first service, and may generate first keep alive messages to maintain the first PDU session. The device may establish a second PDU session with the core network based on the PPPoE and the PPP, and may configure the second PDU session based on the PPPoE and the PPP, where the second PDU session is configured to provide a second service that is different than the first service. The device may generate second keep alive messages to maintain the second PDU session.

20 Claims, 25 Drawing Sheets

Related U.S. Application Data continuation of application No. 16/748,477, filed on Jan. 21, 2020, now Pat. No. 11,166,326.

(51) Int. Cl.
| | |
|---|---|
| *H04W 60/06* | (2009.01) |
| *H04W 76/15* | (2018.01) |
| *H04W 76/22* | (2018.01) |
| *H04W 76/25* | (2018.01) |
| *H04W 76/34* | (2018.01) |
| *H04W 76/38* | (2018.01) |
| *H04W 80/06* | (2009.01) |

(52) U.S. Cl.
CPC ........... *H04W 76/22* (2018.02); *H04W 76/25* (2018.02); *H04W 76/34* (2018.02); *H04W 76/38* (2018.02); *H04W 80/06* (2013.01)

(58) Field of Classification Search
CPC ....... H04W 8/02; H04W 76/15; H04W 80/06; H04W 72/04; H04W 72/12; H04W 76/00; H04B 7/2121; H04B 7/2123; H04J 2203/0069; H04Q 2213/394
See application file for complete search history.

(56) References Cited

U.S. PATENT DOCUMENTS

| | | | |
|---|---|---|---|
| 2004/0233907 A1* | 11/2004 | Hundscheidt | H04L 45/16 370/390 |
| 2009/0265543 A1* | 10/2009 | Khetawat | H04L 63/104 713/151 |
| 2018/0234466 A1* | 8/2018 | Wu | H04L 65/1069 |
| 2018/0359795 A1 | 12/2018 | Baek et al. | |
| 2020/0053131 A1 | 2/2020 | Li et al. | |
| 2020/0244477 A1 | 7/2020 | La | |
| 2020/0329514 A1 | 10/2020 | Yu et al. | |
| 2020/0374956 A1 | 11/2020 | Zhu et al. | |
| 2021/0058970 A1* | 2/2021 | Kwak | H04L 5/0064 |
| 2021/0123286 A1* | 4/2021 | Sostarecz | F16H 1/16 |
| 2022/0046733 A1 | 2/2022 | Padebettu | |
| 2022/0095075 A1* | 3/2022 | Tenny | H04W 4/02 |

OTHER PUBLICATIONS

Makhroute, El-Mehdi, et al. "Implementing and Evaluating a P4-based Access Gateway Function on a Tofino Switch." 2023 6th International Conference on Advanced Communication Technologies and Networking (CommNet). IEEE, 2023. (Year: 2023).*

3rd Generation Partnership Project; Technical Specification GroupServices and System Aspects; Study on the Wireless and Wireline Convergence for the 5G system architecture (Release 16), 3GPP Standard; Technical Report; 3GPP TR 23.716, 3rd Generation Partnership Project (3GPP), Mobile Competence Centre; 650, Route Des Lucioles; F-06921 Sophia-Antipolis Cedex; France, vol. SA WG2, No. V0.3.0, Mar. 12, 2018 (Mar. 12, 2018), pp. 1-44, XP051450341, [retrieved on Mar. 12, 2018].

Allan D., "5G FMC Encapsulation and WT-456", Aug. 2019, 4 pages.

Broadband Forum: "Revision 3 contrib-20838 SD-420 R3 5G Fixed Mobile Convergence Study," 3GPP Draft; SD-420R3, 3rd Generation Partnership Project (3GPP), Mobile Competence Centre ; 650, Route Des Lucioles ; F-06921 Sophia-Antipolis Cedex; France , Nov. 2018, 157 pages, XP051611311, Retrieved from the Internet: [URL: http://www.3gpp.org/ftp/tsg%5Fsa/WG3%5FSecurity/TSGS3%5F94%5FKochi/Docs/S3%2D190029%2Ezip] [retrieved on Jan. 18, 2019].

Chakraborty P., et al., "A Comparative Study for Time Series Forecasting Within Software 5G Networks," 14th International Conference on Signal Processing and Communication Systems (ICSPCS), IEEE, 2020, 7 pages.

Extended European Search Report for Application No. EP21151066.4, mailed on Feb. 24, 2021, 9 pages.

Marin-Lopez R., et al., "Network Access Security for the Internet: Protocol for Carrying Authentication for Network Access." IEEE Communications Magazine, Mar. 2012, vol. 50 (3), pp. 84-92.

Wadhwa S., "5G AGF: NAS proposal", Nokia, Apr. 2019, 10 pages.

* cited by examiner

| PPPoE (8 bits) | |
|---|---|
| 0 (0x00) | PPP session stage |
| 7 (0x07) | PADO, Offer |
| 9 (0x09) | PADI, Initiation |
| 10 (0x0a) | PADG, Session-grant |
| 11 (0x0b) | PADC, Session-credit response |
| 12 (0x0c) | PADQ, Quality |
| 25 (0x19) | PADR, Request |
| 101 (0x65) | PADS, Session-confirmation |
| 167 (0xa7) | PADT, Terminate |
| 211 (0xd3) | PADM, Message |
| 212 (0xd4) | PADN, Network |

| PPP (16 bits) | |
|---|---|
| 21 | Internet protocol version 4 |
| 37 | Bridging PDU |
| 3d | Multi-link |
| 57 | Internet protocol version 6 |
| 00xx | 5G data |
| 281 | MPLS unicast |
| 283 | MPLS multicast |
| 405b | Vendor-specific protocol |
| 8021 | Internet protocol control protocol |
| 8057 | IPv6 control protocol |
| 805b | Vendor-specific network control protocol |
| 80xx | 5G access stratum |
| c021 | Link control protocol |
| c023 | Password authentication protocol |
| c05b | Vendor-specific authentication protocol |
| c223 | Challenge handshake authentication protocol |
| c227 | Extensible authentication protocol |

FIG. 1L

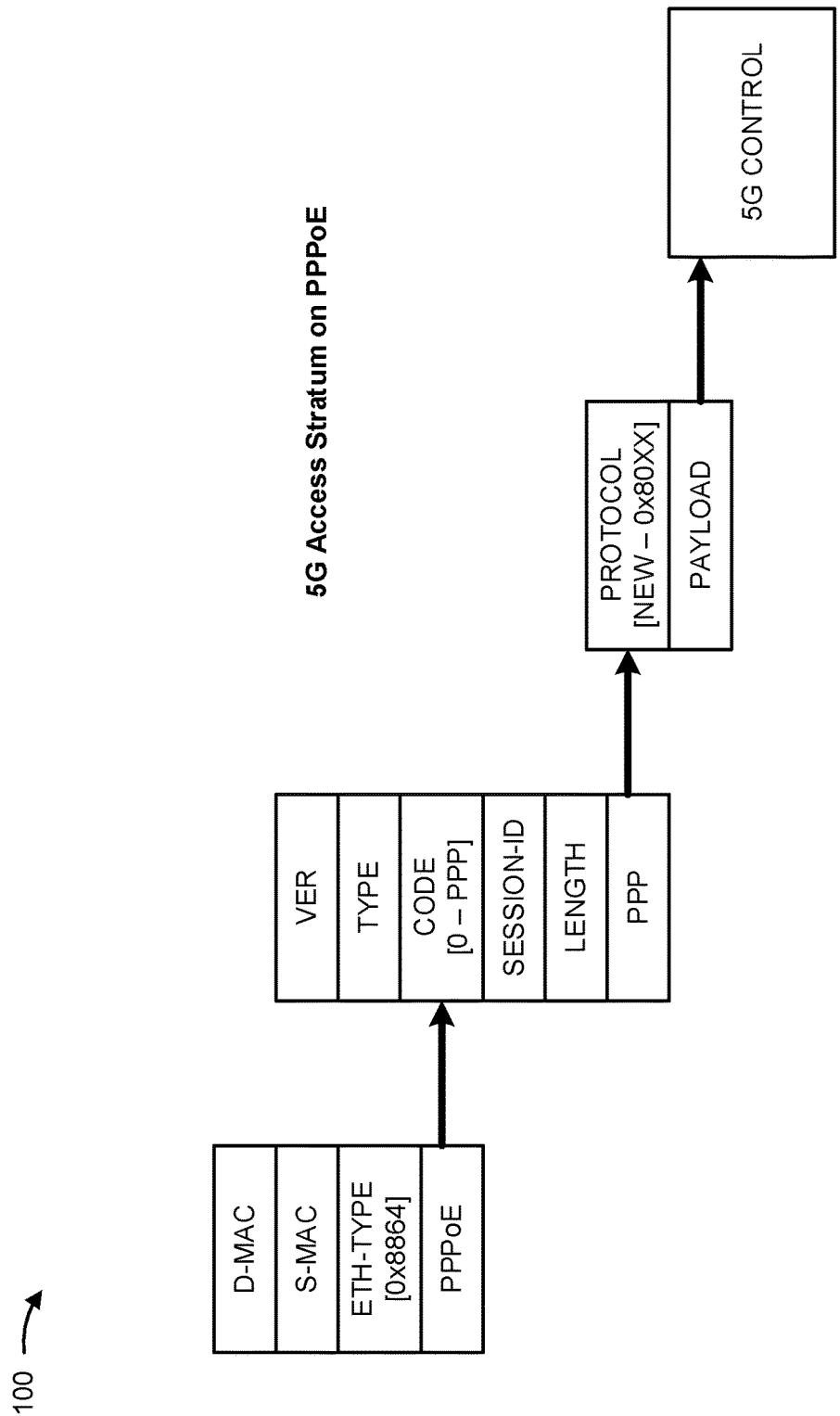

5G Control – NAS Message Format Registration/Deregistration

| Octet | 8 | 7 | 6 | 5 | 4 | 3 | 2 | 1 |
|---|---|---|---|---|---|---|---|---|
| 1 | Version | | | | Flags | | | |
| 2 | Message Type = Registration Request | | | | | | | |
| 3 | S-NSSAI[Octet 1] | | | | | | | |
| 4 | S-NSSAI[Octet 2] | | | | | | | |
| 5 | S-NSSAI[Octet 3] | | | | | | | |
| 6 | S-NSSAI[Octet 4] | | | | | | | |
| 7 | Length of NAS PDU[Octet 1] | | | | | | | |
| 8 | Length of NAS PDU[Octet 2] | | | | | | | |
| | NAS PDU[Octet 1] | | | | | | | |
| | NAS PDU[Octet 2] | | | | | | | |
| | *** | | | | | | | |
| | NAS PDU[Octet N] | | | | | | | |

| Octet | 8 | 7 | 6 | 5 | 4 | 3 | 2 | 1 |
|---|---|---|---|---|---|---|---|---|
| 1 | Version | | | ATLV FLAG = 0 / 1 | Flags | | | |
| 2 | Message Type = Registration Accept/Complete/Reject, Deregistration Request/Accept | | | | | | | |
| 3 | Length of NAS PDU[Octet 1] | | | | | | | |
| 4 | Length of NAS PDU[Octet 2] | | | | | | | |
| | NUMBER of ATLVs = N | | | | | | | |
| | ATLV[1] | | | | | | | |
| | ATLV[2] | | | | | | | |
| | *** | | | | | | | |
| | ATLV[N] | | | | | | | |
| | NAS PDU[Octet 1] | | | | | | | |
| | NAS PDU[Octet 2] | | | | | | | |
| | *** | | | | | | | |
| | NAS PDU[Octet N] | | | | | | | |

FIG. 10

**5G Control – NAS Message Format
PDU Session Management**

| Octet | 8 | 7 | 6 | 5 | 4 | 3 | 2 | 1 |
|---|---|---|---|---|---|---|---|---|
| 1 | | Version | | | | Flags | | |
| 2 | Message Type = PDU Session Establishment Request/Complete, PDU Session Modification Request/Command/Reject/Complete, PDU Session Release Request/Command/Reject/Complete | | | | | | | |
| 3 | PDU Session-ID | | | | | | | |
| 4 | Procedure Transaction ID (PTI) | | | | | | | |
| 5 | Length of NAS PDU[Octet 1] | | | | | | | |
| 6 | Length of NAS PDU[Octet 2] | | | | | | | |
| | NAS PDU[Octet 1] | | | | | | | |
| | NAS PDU[Octet 2] | | | | | | | |
| | *** | | | | | | | |
| | NAS PDU[Octet N] | | | | | | | |

| Octet | 8 | 7 | 6 | 5 | 4 | 3 | 2 | 1 |
|---|---|---|---|---|---|---|---|---|
| 1 | | Version | | | | Flags | | |
| 2 | Message Type = PDU Session Establishment Accept | | | | | | | |
| 3 | PDU Session-ID | | | | | | | |
| 4 | Procedure Transaction ID (PTI) | | | | | | | |
| 5 | 5G Data Session-ID[Octet 1] | | | | | | | |
| 6 | 5G Data Session-ID[Octet 2] | | | | | | | |
| 7 | Length of NAS PDU[Octet 1] | | | | | | | |
| 8 | Length of NAS PDU[Octet 2] | | | | | | | |
| | NAS PDU[Octet 1] | | | | | | | |
| | NAS PDU[Octet 2] | | | | | | | |
| | *** | | | | | | | |
| | NAS PDU[Octet N] | | | | | | | |

FIG. 1P

5G Control – NAS Message Format
Uplink and Downlink Transport

| Octet | 8 | 7 | 6 | 5 | 4 | 3 | 2 | 1 |
|---|---|---|---|---|---|---|---|---|
| 1 | Version | | | | Flags | | | |
| 2 | Message Type = UL Transport / DL Transport | | | | | | | |
| 3 | PDU Session-ID | | | | | | | |
| 4 | Procedure Transaction ID (PTI) | | | | | | | |
| 5 | Length of NAS PDU[Octet 1] | | | | | | | |
| 6 | Length of NAS PDU[Octet 2] | | | | | | | |
| | NAS PDU[Octet 1] | | | | | | | |
| | NAS PDU[Octet 2] | | | | | | | |
| | *** | | | | | | | |
| | NAS PDU[Octet N] | | | | | | | |

| UL Transport | DL Transport |
|---|---|
| Service request | Service accept/reject |
| Configuration update complete | Configuration update command |
| Authentication response/failure | Auth. request/result/reject |
| Identity response | Identity request |
| Security mode complete/reject | Security mode command |
| Security protected 5G NAS message | Security prot. 5G NAS message |
| 5GMM Status | 5GMM Status |
| 5GSM Status | 5GSM Status |
| Notification response | Notification |

FIG. 1Q

5G Data Payload

| Octet | 8 | 7 | 6 | 5 | 4 | 3 | 2 | 1 |
|---|---|---|---|---|---|---|---|---|
| 1 | Version | | | RQoS | Flags | | | |
| 2 | QFI | | | | | | | |
| 3 | PPP Protocol[Octet 1] | | | | | | | |
| 4 | PPP Protocol[Octet 2] | | | | | | | |
| | Data | | | | | | | |

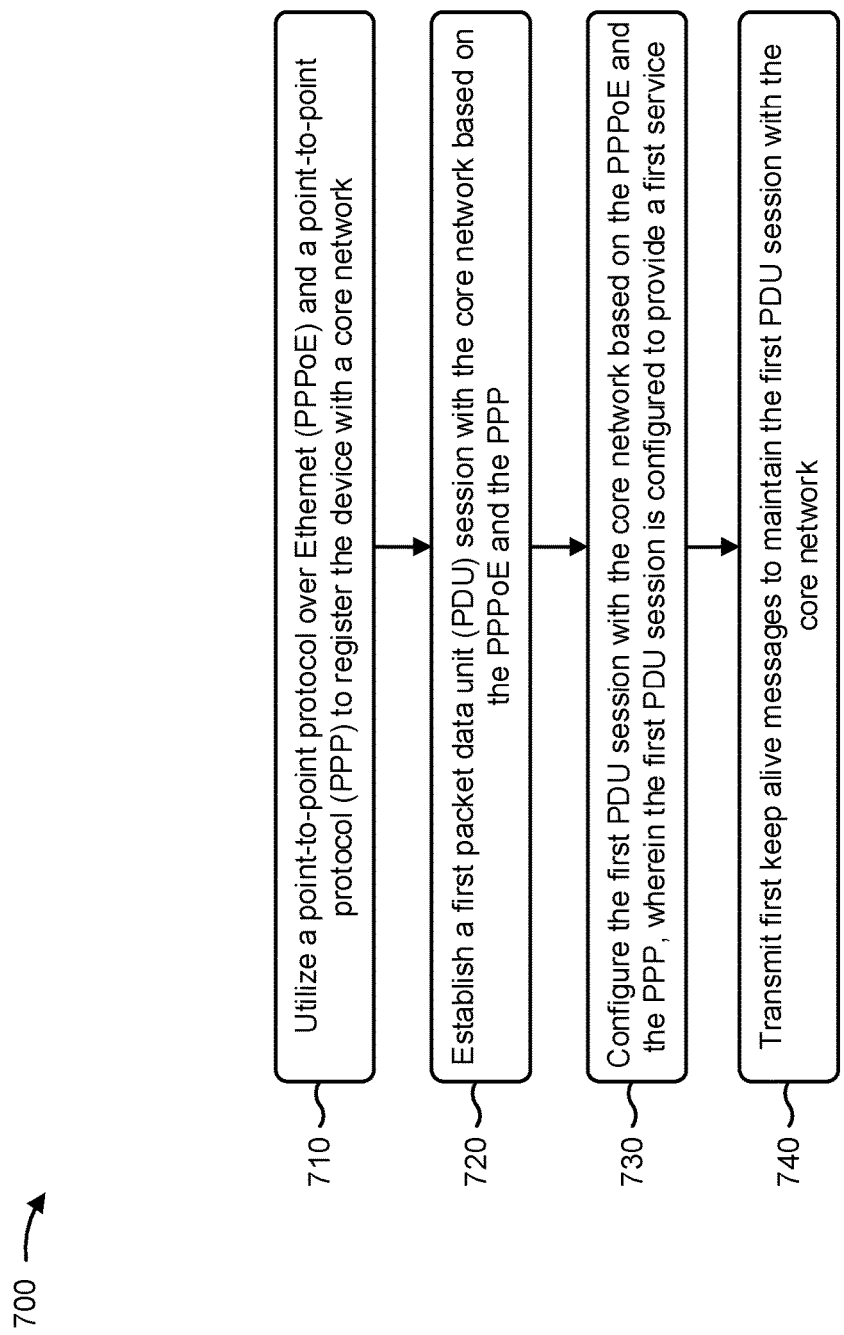

UTILIZING A TRANSPORT PROTOCOL FOR FIFTH GENERATION (5G) CLIENT DEVICES TO CARRY MESSAGES ON WIRELINE ACCESS

RELATED APPLICATIONS

This application is a continuation of U.S. patent application Ser. No. 17/452,448, filed Oct. 27, 2021, which is a continuation of U.S. patent application Ser. No. 16/748,477, filed Jan. 21, 2020 (now U.S. Pat. No. 11,166,326), the contents of which are incorporated herein by reference in their entireties.

BACKGROUND

A client device (e.g., a residential gateway, a user equipment (UE), and/or the like) may be connected to a fifth generation (5G) core network using wireline access (e.g., transmission of information over a physical element, such as a fiber optic able, a coaxial cable, a twisted pair cable, and/or the like). In such an arrangement, the client device may need to transmit non-access stratum (NAS) messages (e.g., packet data units (PDUs)) on the wireline access when the client device is connected to the 5G core network using the wireline access.

SUMMARY

According to some implementations, a method may include utilizing a point-to-point protocol over Ethernet (PPPoE) and a point-to-point protocol (PPP) to register a device with a core network, and establishing a first packet data unit (PDU) session with the core network based on the PPPoE and the PPP. The method may include configuring the first PDU session with the core network based on the PPPoE and the PPP, wherein the first PDU session may be configured to provide a first service, and generating first keep alive messages to maintain the first PDU session with the core network. The method may include establishing a second PDU session with the core network based on the PPPoE and the PPP, and configuring the second PDU session with the core network based on the PPPoE and the PPP, wherein the second PDU session may be configured to provide a second service that is different than the first service. The method may include generating second keep alive messages to maintain the second PDU session with the core network.

According to some implementations, a device may include one or more memories and one or more processors to utilize a PPPoE and a PPP to register the device with a core network, and establish a first PDU session with the core network based on the PPPoE and the PPP. The one or more processors may configure the first PDU session with the core network based on the PPPoE and the PPP, wherein the first PDU session may be configured to provide a first service, and may establish a second PDU session with the core network based on the PPPoE and the PPP. The one or more processors may configure the second PDU session with the core network based on the PPPoE and the PPP, wherein the second PDU session may be configured to provide a second service that is different than the first service.

According to some implementations, a non-transitory computer-readable medium may store one or more instructions that, when executed by one or more processors of a device, may cause the one or more processors to utilize a PPPoE and a PPP to register the device with a core network, and establish a first PDU session with the core network based on the PPPoE and the PPP. The one or more instructions may cause the one or more processors to configure the first PDU session with the core network based on the PPPoE and the PPP, wherein the first PDU session may be configured to provide a first service. The one or more instructions may cause the one or more processors to transmit first keep alive messages to maintain the first PDU session with the core network.

BRIEF DESCRIPTION OF THE DRAWINGS

FIGS. 5-7 are flow charts of example processes for utilizing a transport protocol for 5G client devices to carry messages on wireline access.

DETAILED DESCRIPTION

Figure 1A:
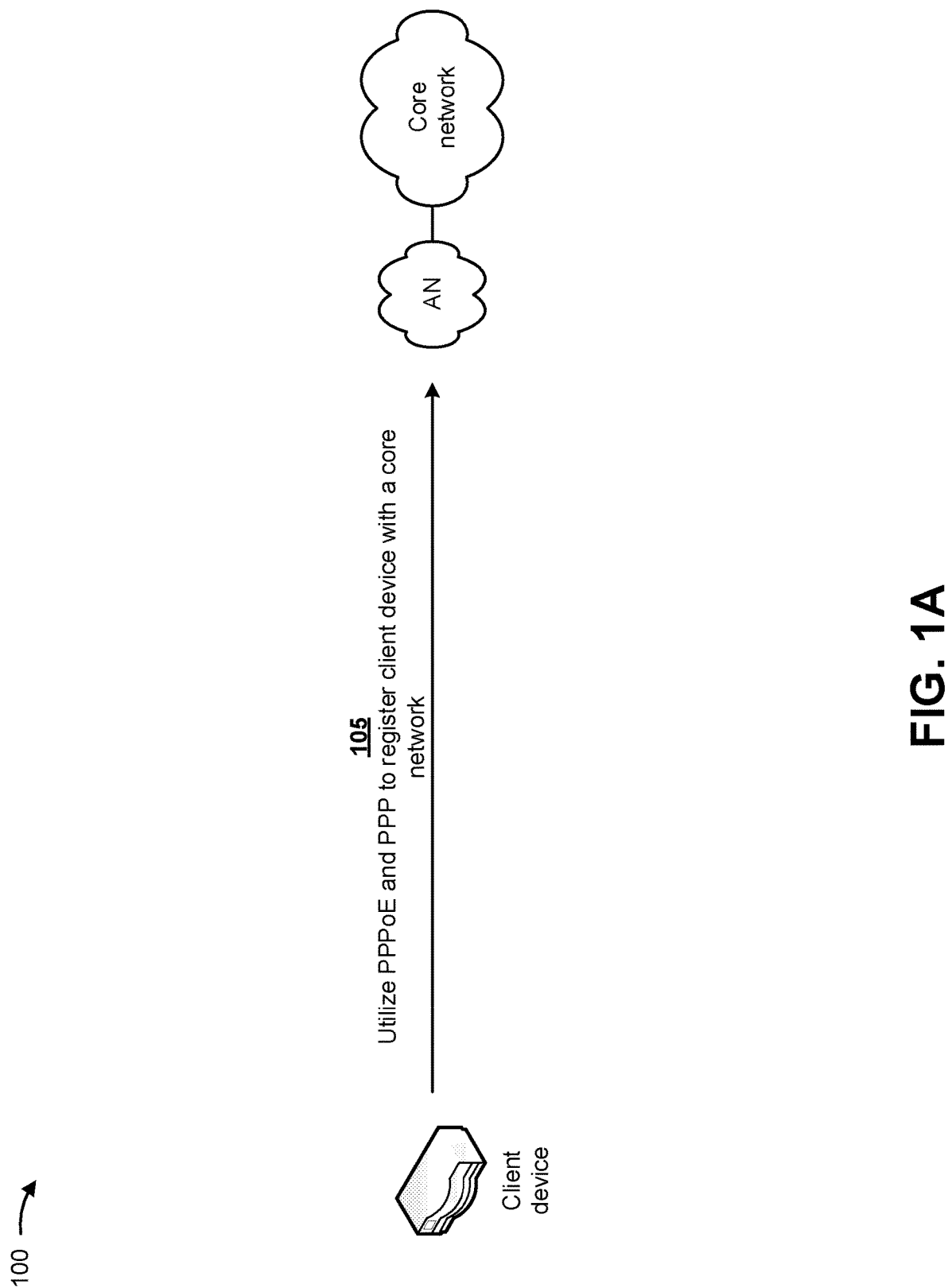
FIGS. 1A-1S are diagrams of one or more example implementations described herein.

The following detailed description of example implementations refers to the accompanying drawings. The same reference numbers in different drawings may identify the same or similar elements.

Currently, NAS messages may be transmitted via a single PDU session model or a multi-access PDU session model, and multiple (e.g., single or multi-access) PDU sessions may be required for transmitting the NAS messages. Traffic for each PDU session may be destined for different core network devices and may require different services (e.g., an aggregate maximum bitrate, a guaranteed bitrate, quality of service (QoS) shaping requirements, and/or the like). However, identifying different PDU sessions from a same client device may not be achievable by using a media access control (MAC) address, an Internet protocol (IP) address, virtual local area networks (VLANs), and/or the like.

One current technique to handle different PDU sessions includes causing the control plane to utilize an extensible authentication protocol (EAP) over PPPoE to transport NAS control plane packets. Unfortunately, since the EAP carries the NAS packets, the forwarding plane may be required to perform time consuming and resource intensive deep packet inspection to identify packets to be provided to the control plane. The EAP is always initiated from the core network side and only a 5G-capable client device may respond to the EAP. Moreover, an EAP request that seeks to identify 5G capabilities of the client devices will impact existing client devices that are EAP capable but not 5G capable.

Another current technique to handle different PDU sessions includes causing the data plane to utilize stateless PPPoE to transport the data packets. In this technique, a session identifier is allocated by the client device and a core network device blindly accepts the packet based on the session identifier, which exposes the core network device to potential attacks. Furthermore, a combination of a MAC address and a session identifier from the client device will be insufficient to uniquely identify a PDU session, and this technique requires expensive changes to an access network of the core network.

Thus, current techniques to handle different PDU sessions may waste computing resources (e.g., processing resources, memory resources, communication resources, and/or the like), networking resources, and/or the like associated with performing deep packet inspection, determining 5G capability of a client device, modifying an access network, handling network attacks, and/or the like.

Some implementations described herein provide a client device that utilizes a transport protocol to carry messages via wireline access to a 5G core network. For example, the client device may utilize a PPPoE and a PPP to register the client device with a core network, and may establish a first PDU session with the core network based on the PPPoE and the PPP. The client device may configure the first PDU session with the core network based on the PPPoE and the PPP, where the first PDU session may be configured to provide a first service, and may generate first keep alive messages to maintain the first PDU session with the core network. The client device may establish a second PDU session with the core network based on the PPPoE and the PPP, and may configure the second PDU session with the core network based on the PPPoE and the PPP, where the second PDU session may be configured to provide a second service that is different than the first service. The client device may generate second keep alive messages to maintain the second PDU session with the core network.

In this way, the client device may utilize a transport protocol to carry messages via wireline access to a 5G core network. The client device may utilize PPPoE and PPP with a new set of protocol identifiers for control traffic (e.g., packets) and data traffic. The client device may utilize the PPPoE and PPP to handle multiple PDU sessions and thus provide different services to the multiple PDU sessions, as required. This, in turn, conserves computing resources (e.g., processing resources, memory resources, communication resources, and/or the like), networking resources, and/or the like that would otherwise be wasted in performing deep packet inspection, determining 5G capability of a client device, modifying an access network, handling network attacks, and/or the like.

FIGS. 1A-1S are diagrams of one or more example implementations 100 described herein. As shown in FIG. 1A, a client device may be associated with a wireline access network (AN) and a core network. The client device may include a network device (e.g., a residential gateway), a mobile device (e.g., a user equipment), and/or the like that utilizes a transport protocol to carry messages via wireline access to the core network. The AN may include one or more radio transmitters. The core network may include an example architecture of a 5G next generation (NG) core network included in a 5G wireless telecommunications system, and may include physical elements, virtual elements, or a combination of physical and virtual elements.

As further shown in FIG. 1A, and by reference number 105, the client device may utilize PPPoE and PPP to register the client device with the core network. In some implementations, the client device may utilize PPPoE and PPP as a transport protocol to carry messages via wireline access to the core network, as described herein. In some implementations, the client device may utilize PPPoE and PPP to register the client device with the core network using the call flow shown in FIG. 1B.

Figure 1B:
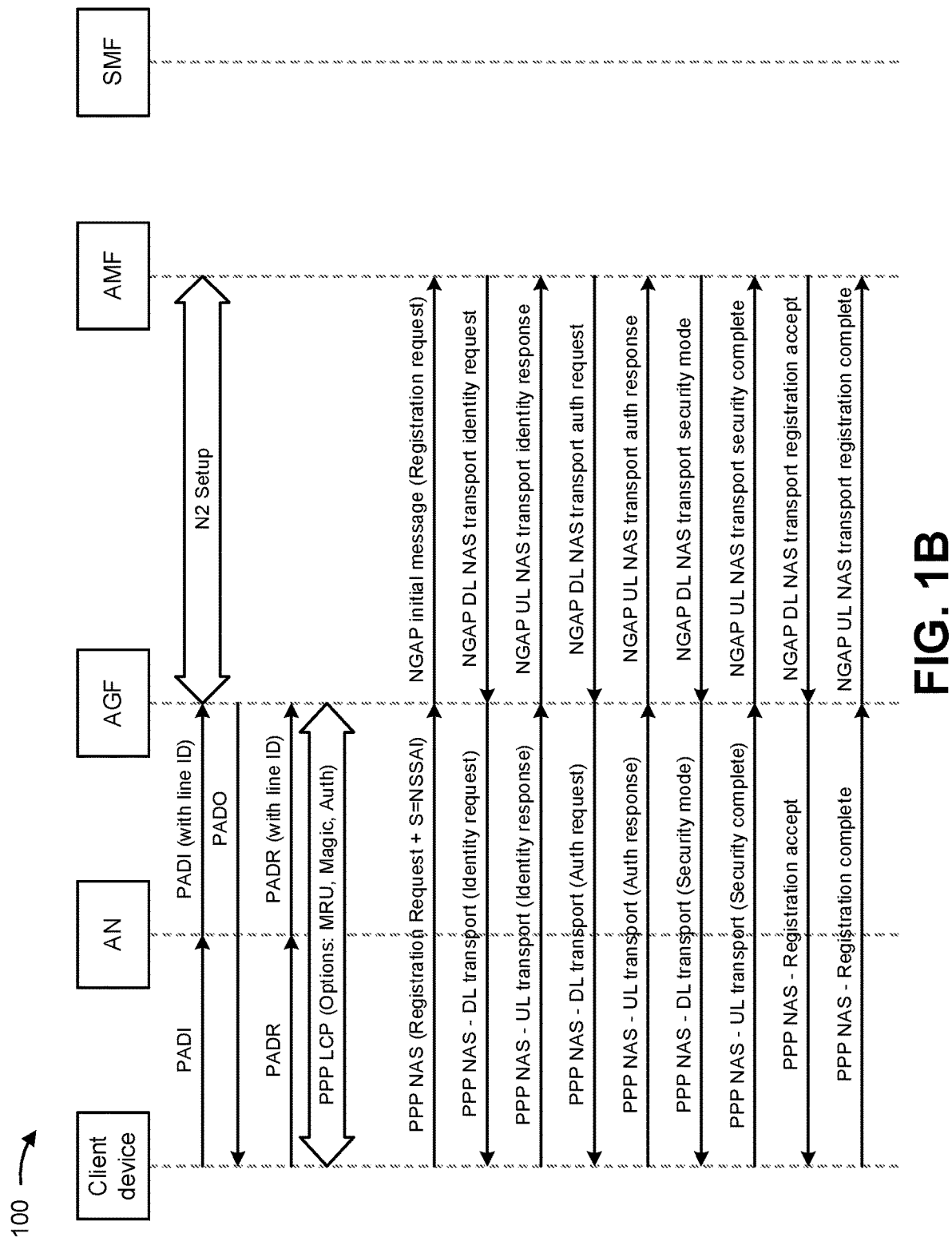

As shown in FIG. 1B, the client device may be associated with the AN, and an access gateway function (AGF), an access and mobility management function (AMF), a session management function (SMF), and a user plane function (UPF) of the core network. As further shown in FIG. 1B, the client device may provide a registration initiation request (e.g., a PPPoE active discovery initiation (PADI) packet) to the AN, and the AN may provide the registration initiation request (e.g., and an identifier of the client device) to the AGF. The AGF and the AMF may set up an N2 interface provided between the AGF and the AMF. The AGF may provide an offer response (e.g., a PPPoE active discovery offer (PADO) packet) to the client device. The client device may provide a registration request (e.g., a PPPoE active discovery request (PADR) packet) to the AN, and the AN may provide the registration request (e.g., and the identifier of the client device) to the AGF. The client device and the AGF may establish a PPP link control protocol (LCP) connection to exchange information (e.g., a maximum receive unit (MRU), a randomly generated number (e.g., referred to as a magic number), authorization information, and/or the like).

As further shown in FIG. 1B, the client device may provide a registration request (e.g., a PPP NAS registration request that includes network slice selection assistance information (NSSAI)) to the AGF, and the AGF may provide a next generation application protocol (NGAP) initial message (e.g., the registration request) to the AMF. Based on receiving the initial message, the AMF may provide an NGAP downlink NAS transport identity request (e.g., that seeks an identity of the client device) to the AGF, and the AGF may provide the identity request to the client device via a PPP NAS downlink message. The client device may provide an identity response (e.g., identifying the client device), via a PPP NAS uplink message, to the AGF, and the AGF may provide the identity response to the AMF (e.g., via NGAP uplink NAS transport). Based on receiving the identity response, the AMF may provide an NGAP downlink NAS transport authentication request (e.g., that seeks authentication of the client device) to the AGF, and the AGF may provide the authentication request to the client device via a PPP NAS downlink message. The client device may provide an authentication response (e.g., authenticating the client device), via a PPP NAS uplink message, to the AGF, and the AGF may provide the identity response to the AMF (e.g., via NGAP uplink NAS transport).

Based on receiving the authentication response, the AMF may provide an NGAP downlink NAS transport security mode command (e.g., to be executed by the client device) to the AGF, and the AGF may provide the security mode command to the client device via a PPP NAS downlink message. The client device may execute the security mode command and provide a security mode complete response (e.g., indicating that the client device executed the security mode command), via a PPP NAS uplink message, to the AGF, and the AGF may provide the security mode complete response to the AMF (e.g., via NGAP uplink NAS transport). Based on receiving the security mode complete response, the AMF may provide an NGAP downlink NAS transport registration accept (e.g., to be accepted by the client device) to the AGF, and the AGF may provide the registration accept to the client device via a PPP NAS message. The client device may accept the registration and provide a registration complete response (e.g., indicating that the client device executed the security mode command), via a PPP NAS uplink message, to the AGF. Based on receiving the registration complete response, the AGF may provide registration complete response to the AMF (e.g., via NGAP uplink NAS transport).

Figure 1C:
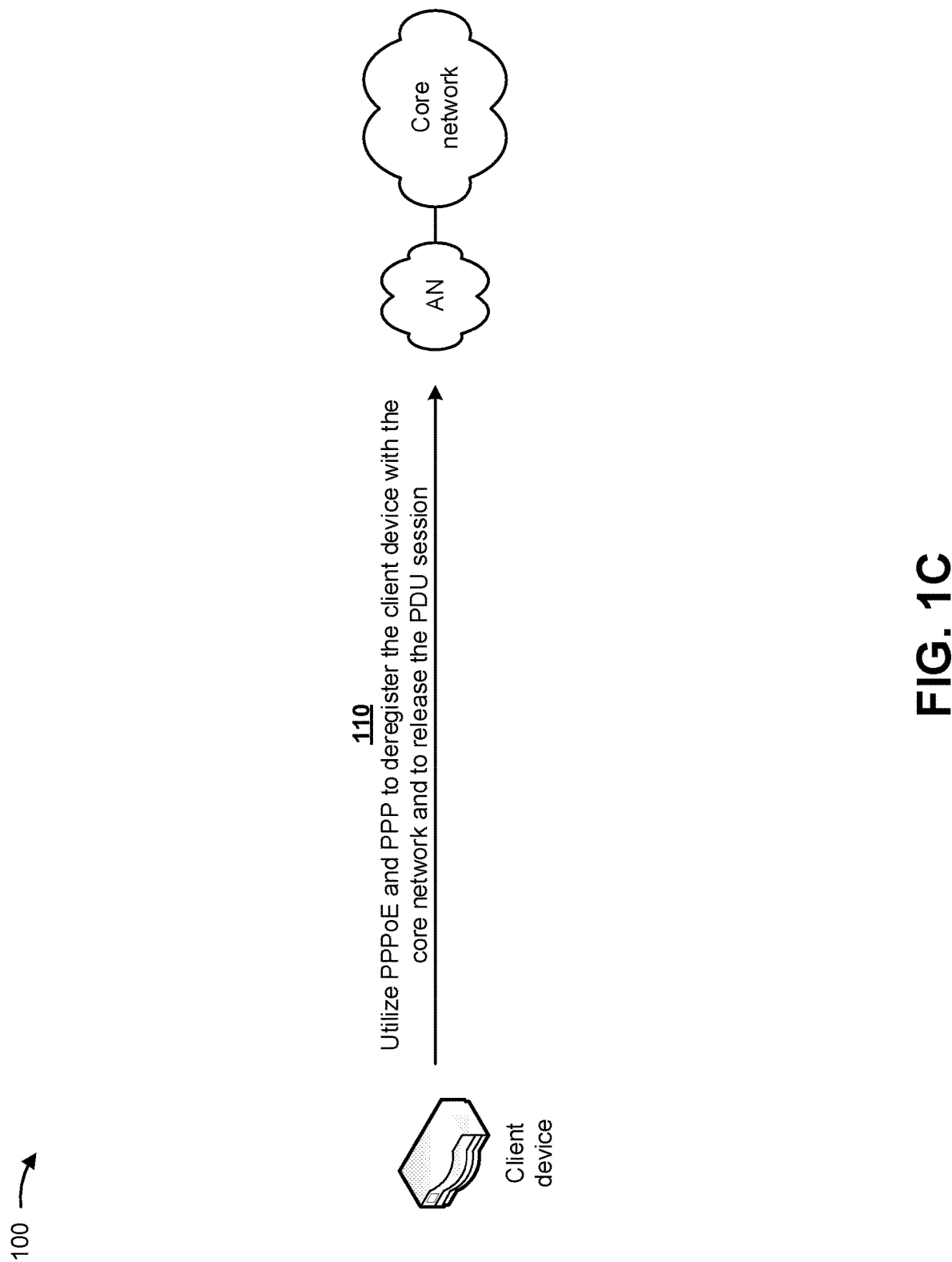

As shown in FIG. 1C, and by reference number 110, the client device may utilize PPPoE and PPP to deregister the client device with the core network and to release a PDU session (e.g., after registration of the client device and based on ending a PDU session). In some implementations, the client device may utilize PPPoE and PPP to deregister the client device with the core network using the call flow shown in FIG. 1D.

Figure 1D:
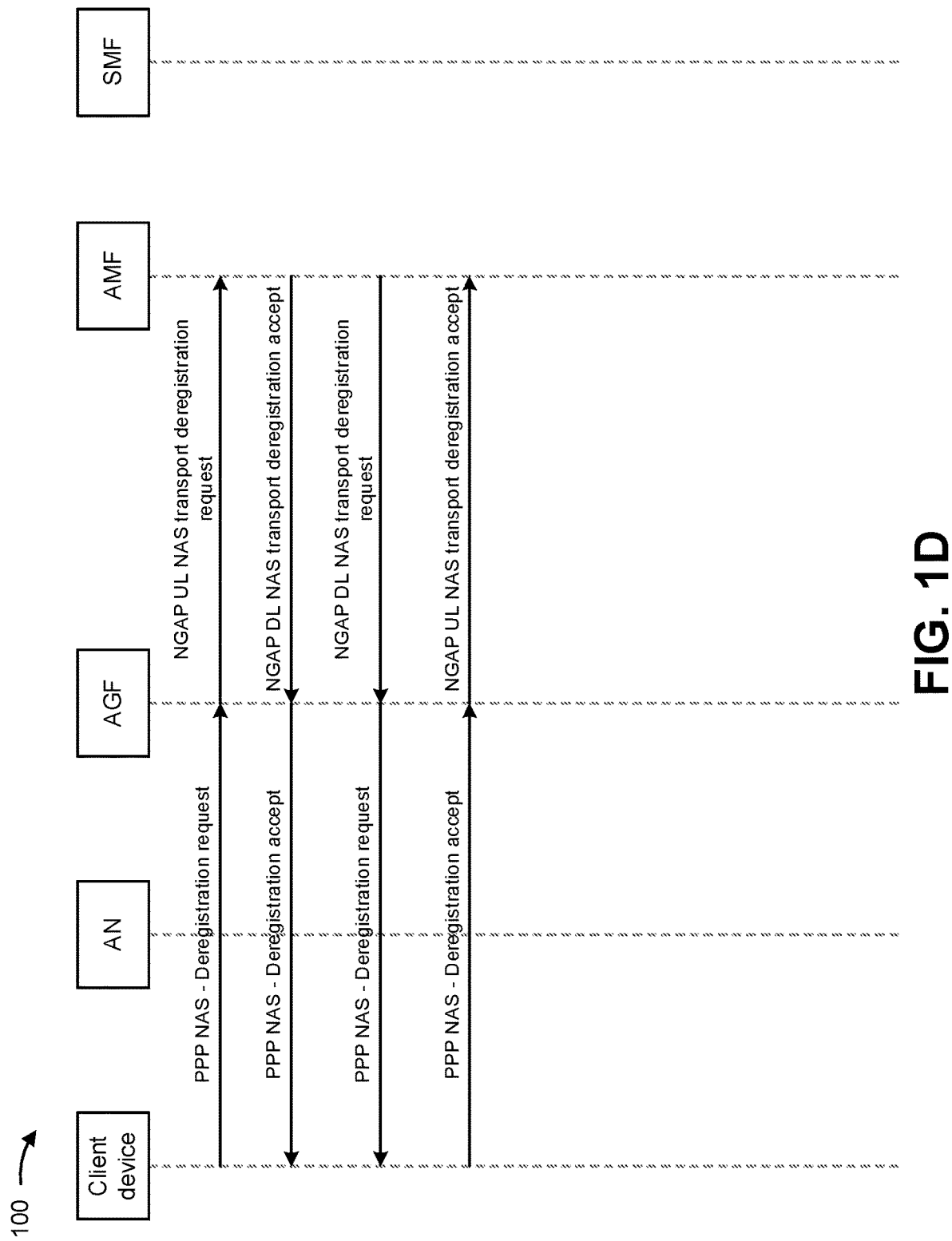

As shown in FIG. 1D, the client device may provide a deregistration request to the AGF via a PPP NAS message, and the AGF may provide the deregistration request to the AMF (e.g., via NGAP uplink NAS transport). Based on receiving the deregistration request, the AMF may deregister the client device with the core network and may provide an NGAP downlink NAS transport deregistration accept message to the AGF. The AGF may provide the deregistration accept message to the client device via a PPP NAS message. The AMF may also provide another NGAP downlink NAS transport deregistration request to the AGF, and the AGF may provide the other deregistration request to the client device via a PPP NAS message. The client device may accept the deregistration request and may provide another deregistration accept message to the AGF via a PPP NAS message. The AGF may provide the other deregistration accept message to the AMF (e.g., via NGAP uplink NAS transport) and the client device may be deregistered with the core network.

Figure 1E:
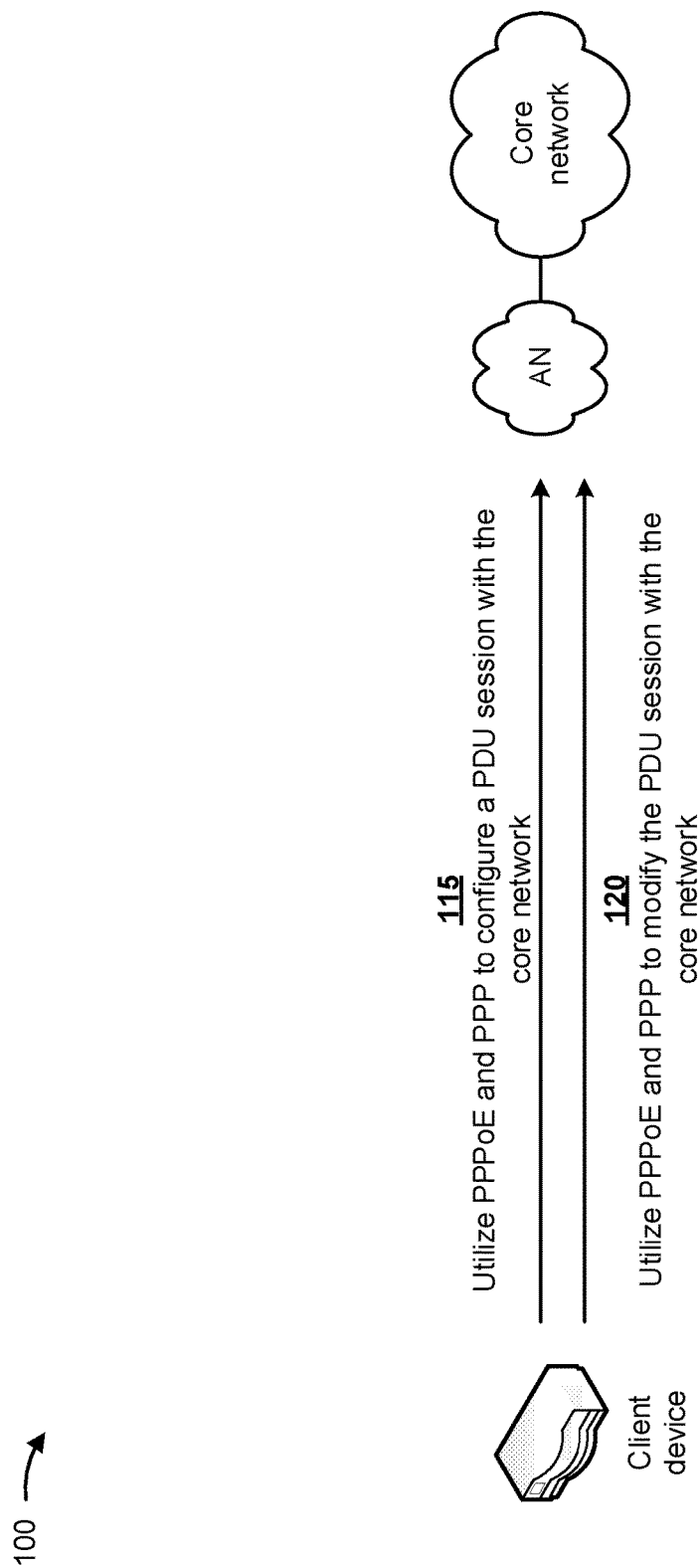

As shown in FIG. 1E, and by reference number 115, the client device may utilize PPPoE and PPP to configure a PDU session with the core network. In some implementations, the client device may utilize PPPoE and PPP to configure the PDU session with the core network using a top portion of the call flow shown in FIG. 1F. As further shown in FIG. 1E, and by reference number 120, the client device may utilize PPPoE and PPP to modify the PDU session with the core network. In some implementations, the client device may utilize PPPoE and PPP to modify the PDU session with the core network using a bottom portion of the call flow shown in FIG. 1F.

Figure 1F:
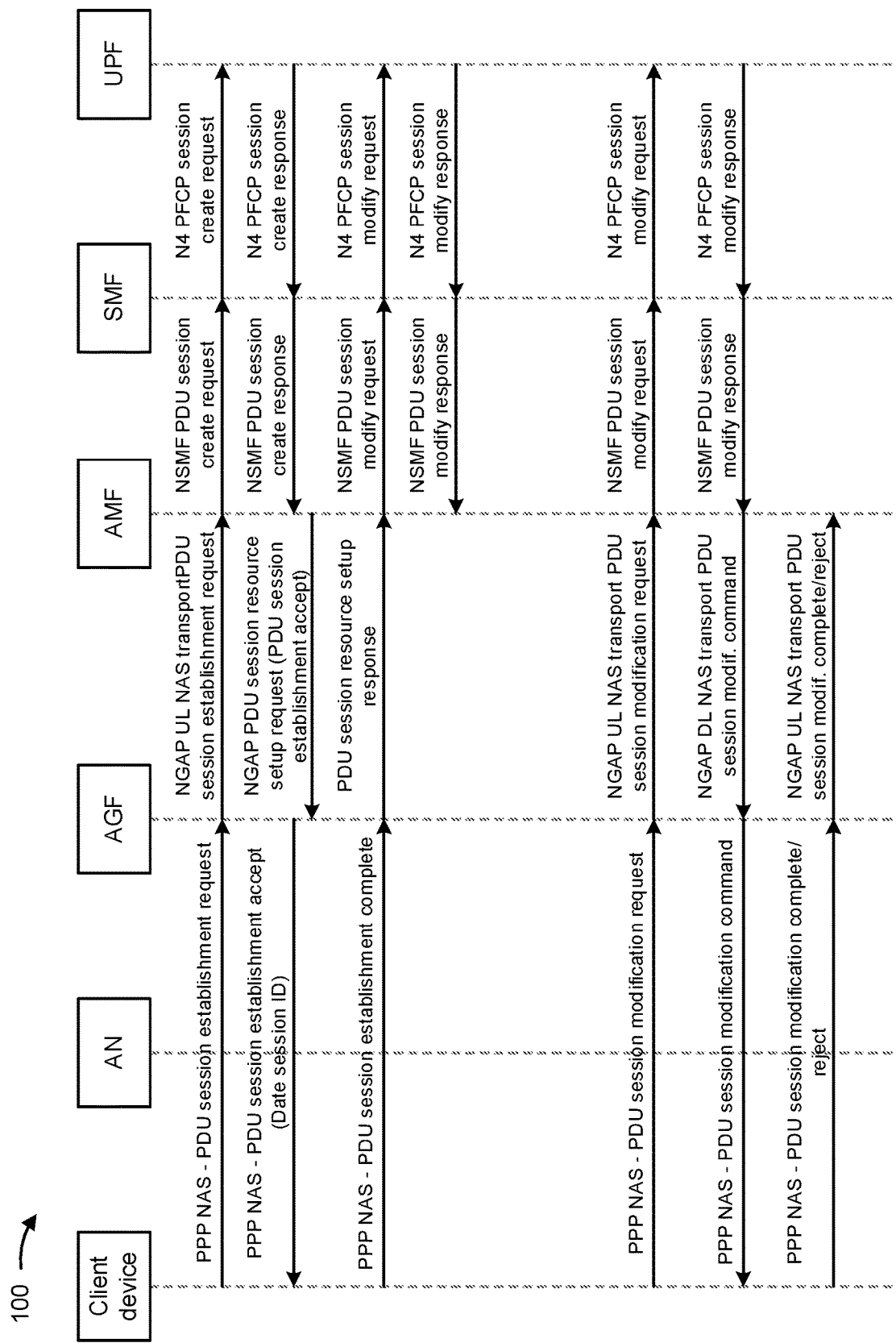

As shown at the top portion of FIG. 1F, the client device (e.g., in order to establish and configure a PDU session) may provide a PDU session establishment request to the AGF via a PPP NAS message, and the AGF may provide the PDU session establishment request to the AMF via NGAP uplink NAS transport. Based on receiving the PDU session establishment request, the AMF may provide a network slice management function (NSMF) PDU session create request to the SMF, and the SMF may provide an N4 packet forwarding control protocol (PFCP) session create request to the UPF. The UPF may accept the N4 PFCP session create request and may provide an N4 PFCP session create response to the SMF. The SMF may provide an NSMF PDU session create response to the AMF, and the AMF may provide a PDU session establishment accept to the AGF via a NGAP PDU session resource setup request. The AGF may provide the PDU session establishment accept (e.g., and a data session identifier) to the client device, and the client device may establish the PDU session with the core network. Based on establishing the PDU session, the client device may provide a PDU session establishment complete, via a PPP NAS message, to the AGF, and the AGF may provide an NGAP PDU session resource setup response to the AMF. The AMF may provide an NSMF PDU session modify request to the SMF, and the SMF may provide an N4 PFCP session modify request to the UPF. The UPF may provide an N4 PFCP session modify response to the SMF, and the SMF may provide an NSMF session modify response to the AMF.

As shown at the bottom portion of FIG. 1F, the client device (e.g., in order to modify a PDU session) may provide a PDU session modification request, via a PPP NAS message, to the AGF. The AGF may provide the PDU session modification request to the AMF via NGAP uplink NAS transport, and the AMF may provide an NSMF session modification request to the SMF. The SMF may provide an N4 PFCP session modify response to the UPF, and the UPF may provide an N4 PFCP session modify response to the SMF. The SMF may provide an NSMF session modify response to the AMF, and the AMF may provide a PDU session modification command to the AGF via NGAP downlink NAS transport. The AGF may provide the PDU session modification command to the client device, via a PPP NAS downlink transport message, and the client device may execute the PDU session modification command in order to modify the PDU session or may reject the modification. The client device may provide a PDU session modification complete/reject, via PPP NAS message, to the AGF, and the AGF may provide the PDU session modification complete/reject to the AMF via NGAP uplink NAS transport.

Figure 1G:
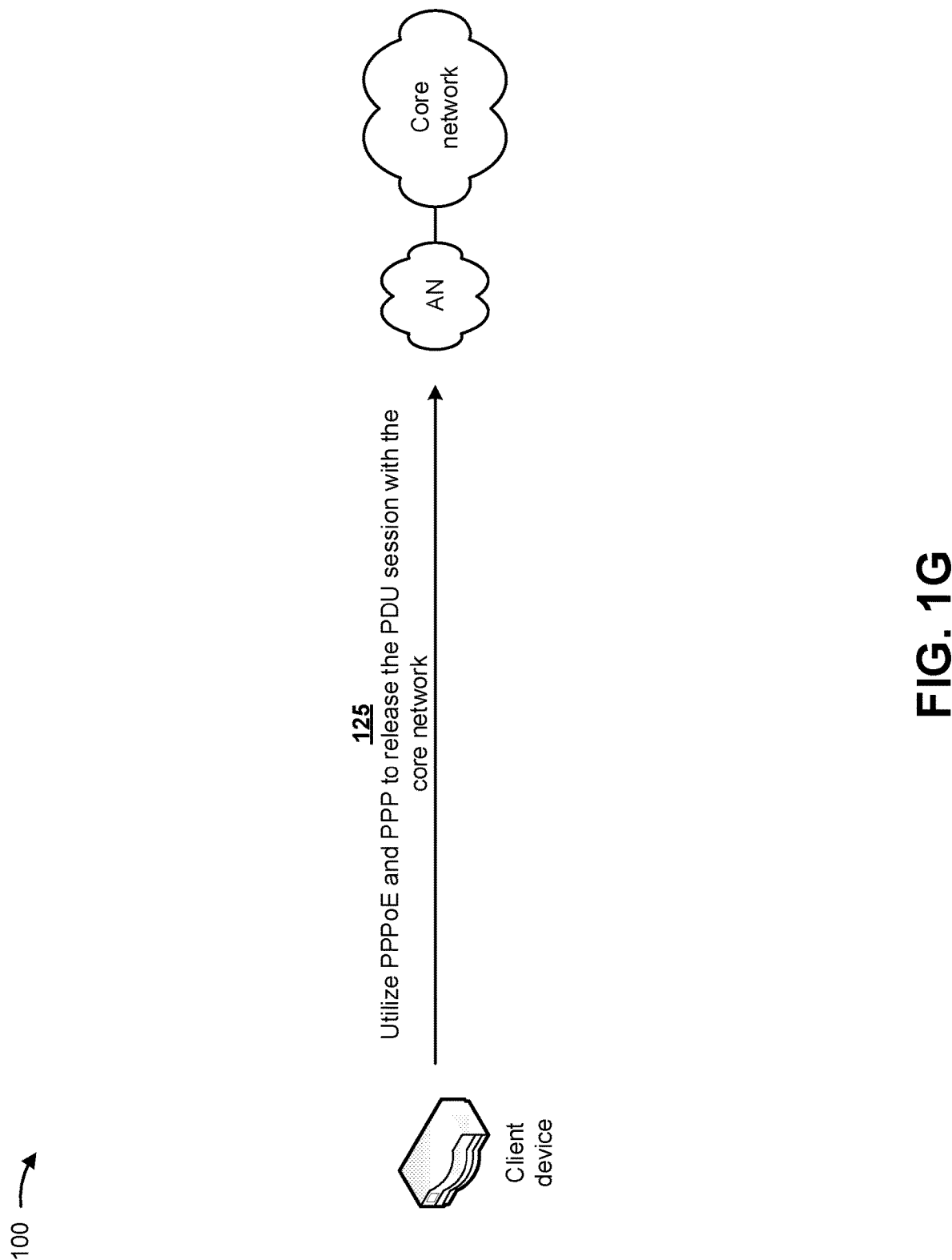

As shown in FIG. 1G, and by reference number 125, the client device may utilize PPPoE and PPP to release the PDU session with the core network. In some implementations, the client device may utilize PPPoE and PPP to release the PDU session with the core network using the call flow shown in FIG. 1H.

Figure 1H:
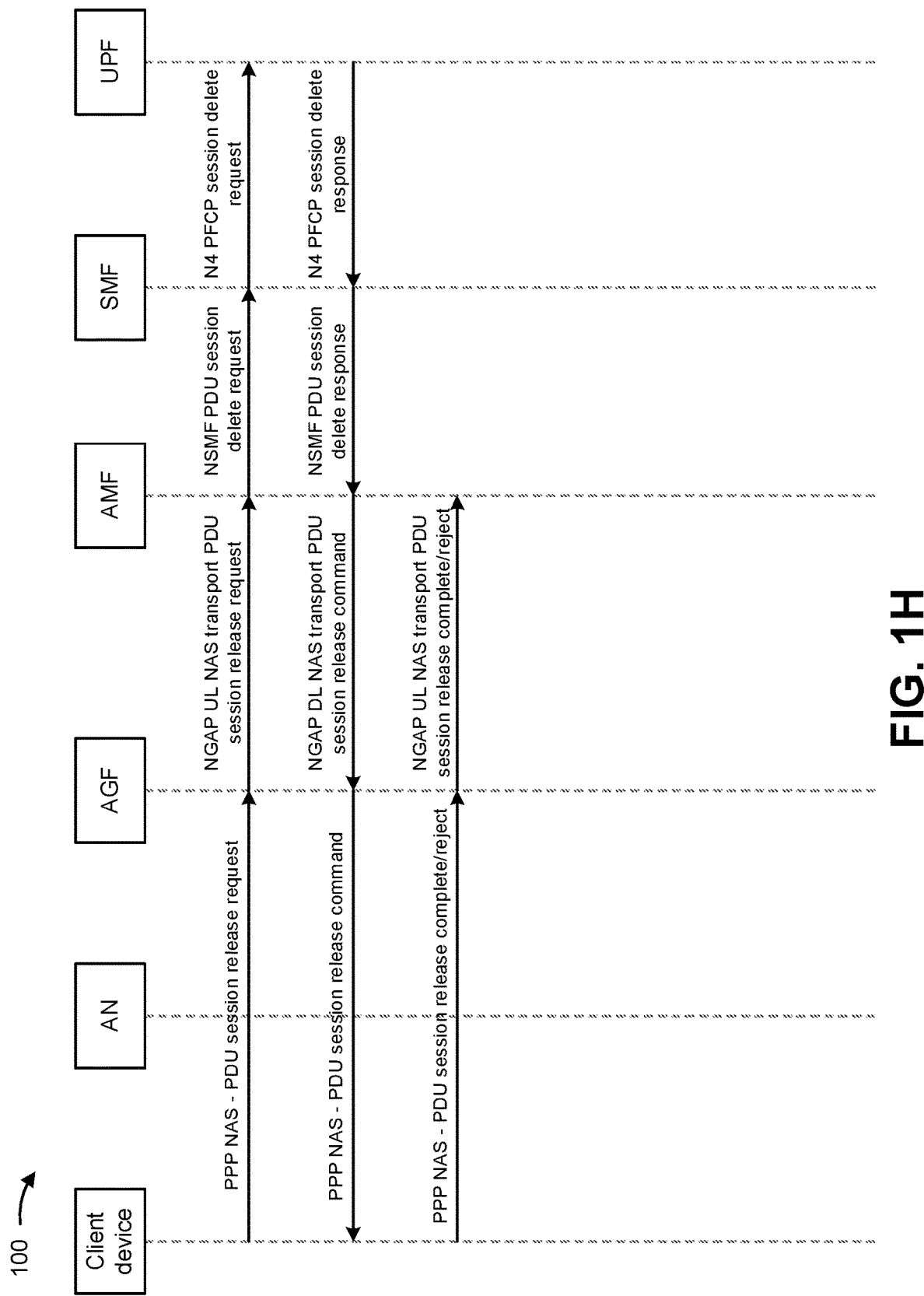

As shown in FIG. 1H, the client device (e.g., in order to release the PDU session) may provide a PDU session release request to the AGF via a PPP NAS message, and the AGF may provide the PDU session release request to the AMF via NGAP uplink NAS transport. Based on receiving the PDU session release request, the AMF may provide an NSMF PDU session delete request to the SMF, and the SMF may provide an N4 PFCP session delete request to the UPF. The UPF may provide an N4 PFCP session delete response (e.g., indicating that the PDU session will be deleted) to the SMF, and the SMF may provide a NSMF PDU session delete response to the AMF. Based on receiving the NSMF PDU session delete response, the AMF may provide a PDU session release command to the AGF via NGAP downlink NAS transport, and the AGF may provide the PDU session release command to the client device via a PPP NAS message. The client device may execute the PDU session release command to release the PDU session or may reject the command. The client device may then provide a PDU session release complete/reject, via a PPP NAS message, to the AGF, and the AGF may provide the PDU session release complete/reject to the AMF via NGAP uplink NAS transport.

Figure 1I:
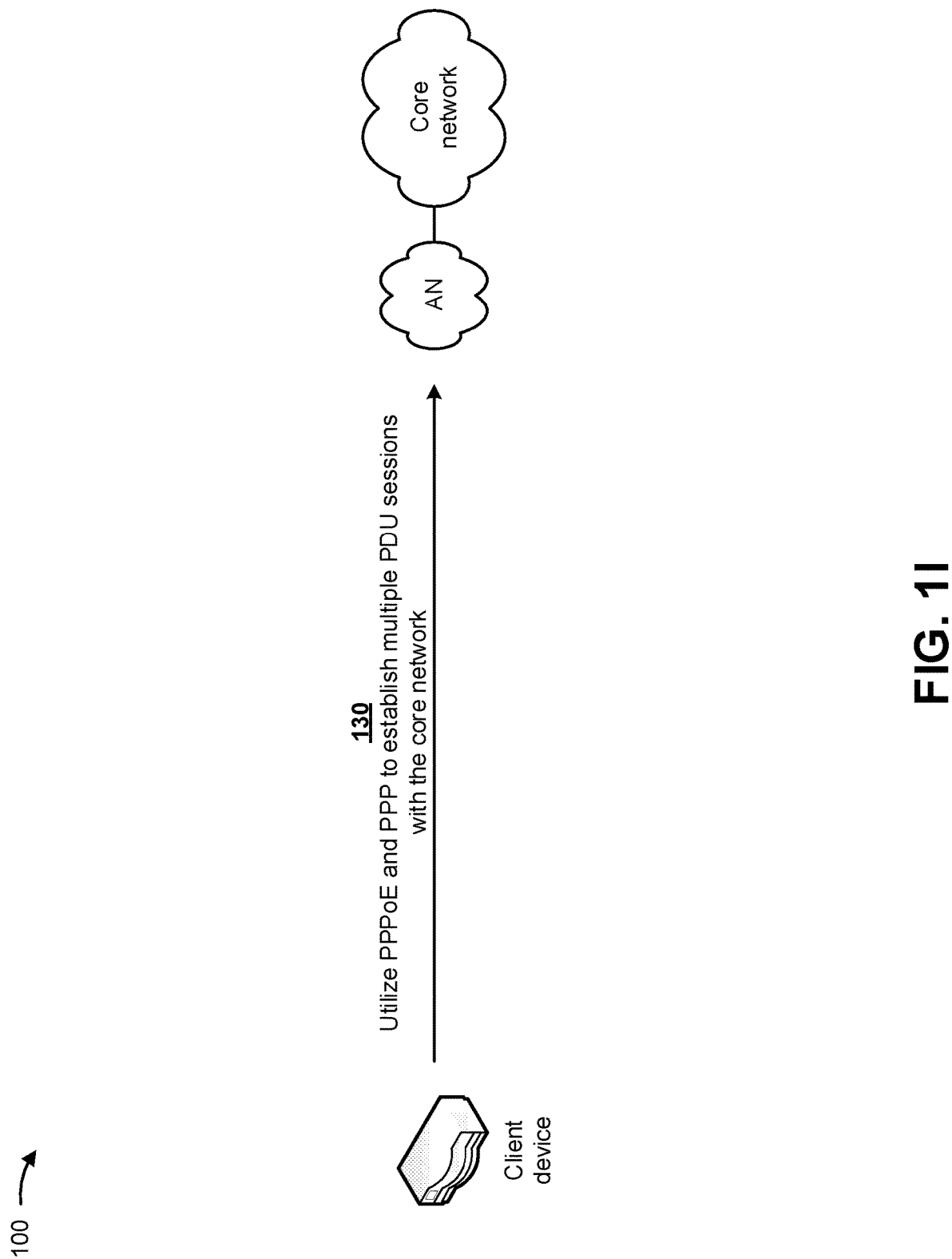

As shown in FIG. 1I, and by reference number 130, the client device may utilize PPPoE and PPP to establish multiple PDU sessions with the core network. In some implementations, the client device may utilize PPPoE and PPP to establish multiple PDU sessions with the core network using the call flows shown in FIGS. 1J and 1K.

Figure 1J:
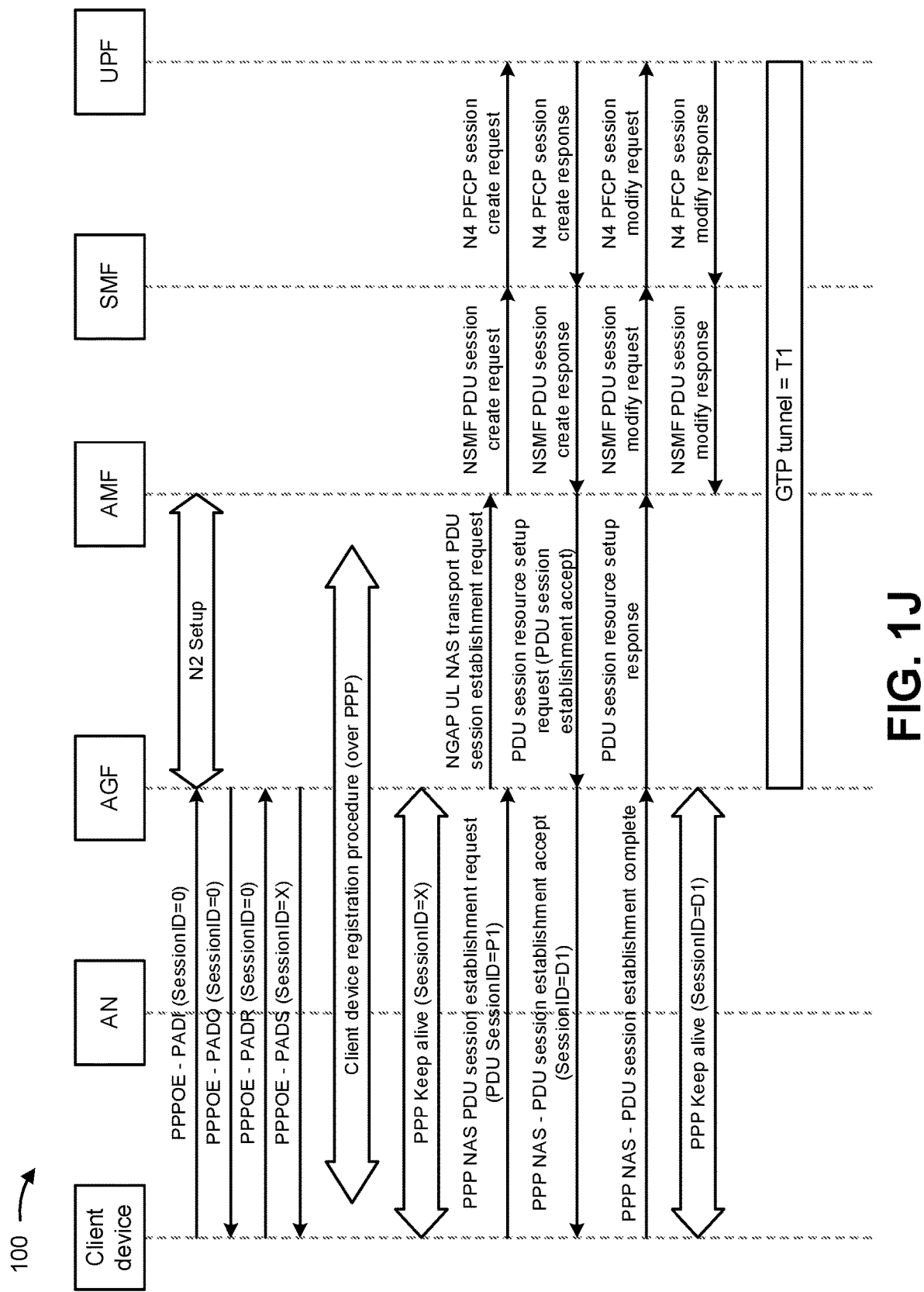

As shown in FIG. 1J, the client device (e.g., in order to establish a first PDU session and a second PDU session) may provide a registration initiation request (e.g., a PADI packet) and a session identifier (e.g., 0) to the AGF, and the AGF may provide an offer response (e.g., a PADO) packet to the client device. The AGF and the AMF may set up an N2 interface provided between the AGF and the AMF. The client device may provide a registration request (e.g., a PADR packet) to the AGF, and the AGF may respond with a session confirmation (e.g., a PPPoE active discovery session confirmation (PADS) packet) and a session identifier (e.g., X). The client device and the AMF may complete a registration procedure for the client device. The client device and the AGF may generate and transmit PPP keep alive messages in order to maintain the session (e.g., session X).

As further shown in FIG. 1J, the client device (e.g., in order to establish the first PDU session) may provide a PDU session establishment request and a PDU session identifier (e.g., P1) to the AGF via a PPP NAS message, and the AGF may provide the PDU session establishment request to the AMF via NGAP uplink NAS transport. Based on receiving the PDU session establishment request, the AMF may provide an NSMF PDU session create request to the SMF, and the SMF may provide an N4 PFCP session create request to the UPF. The UPF may accept the N4 PFCP session create request and may provide an N4 PFCP session create response to the SMF. The SMF may provide an NSMF PDU session create response to the AMF, and the AMF may provide a PDU session establishment accept to the AGF via a PDU session resource setup request. The AGF may provide the PDU session establishment accept (e.g., and a session identifier D1) to the client device, and the client device may establish the first PDU session with the core network. Based on establishing the first PDU session, the client device may provide a PDU session establishment complete, via a PPP NAS message, to the AGF, and the AGF may provide a PDU session resource setup response to the AMF. The AMF may provide an NSMF PDU session modify request to the SMF, and the SMF may provide an N4 PFCP session modify request to the UPF. The UPF may provide an N4 PFCP session modify response to the SMF, and the SMF may provide an NSMF PDU session modify response to the AMF. The client device and the AGF may generate and transmit PPP keep alive messages in order to maintain the first PDU session (e.g., session D1). The AGF and the UPF may establish a first general packet radio service (GPRS) tunneling protocol (GTP) tunnel (e.g., T1) for the first PDU session.

Figure 1K:
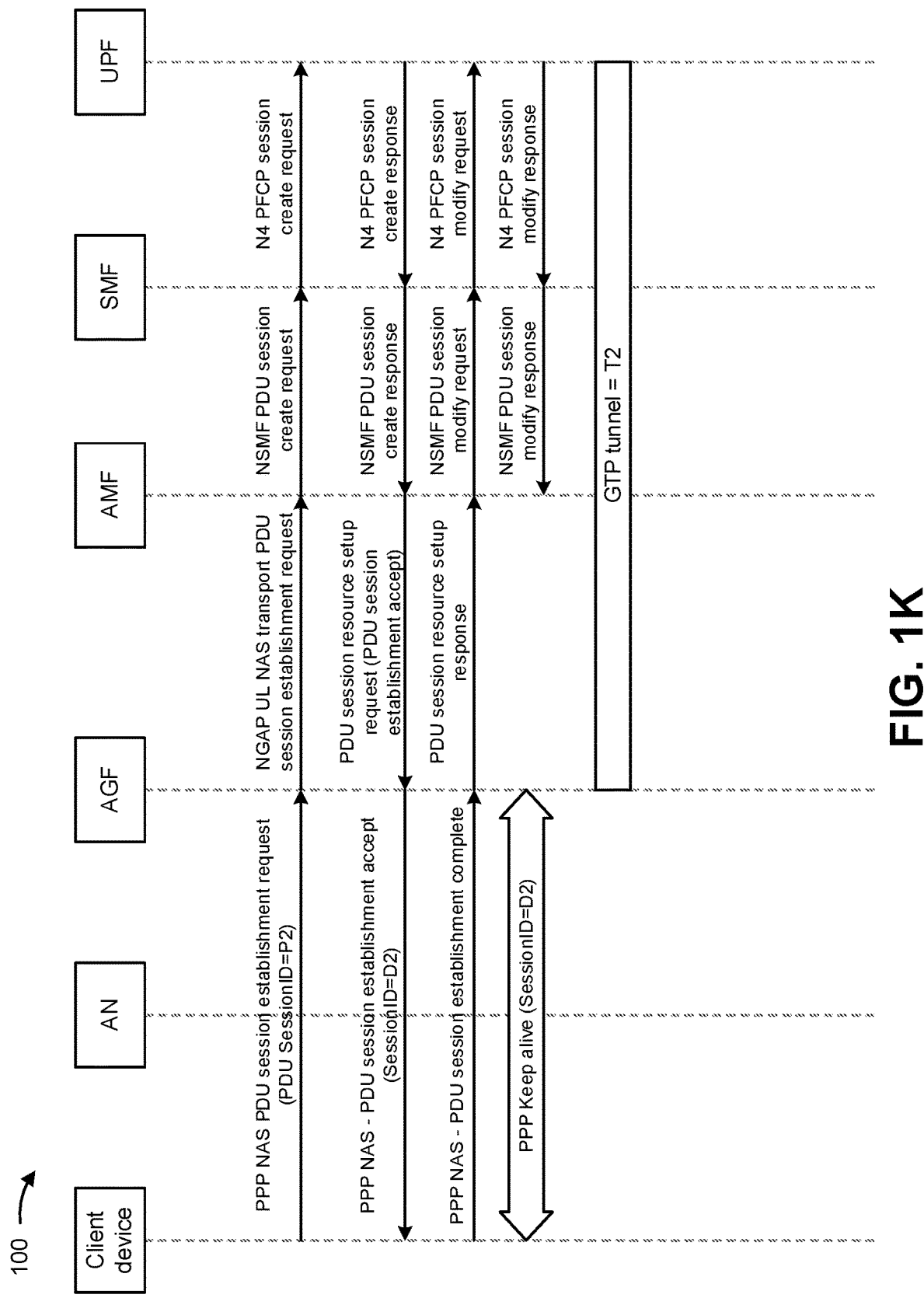

As shown in FIG. 1K, the client device (e.g., in order to establish the second PDU session) may provide a PDU session establishment request and a PDU session identifier (e.g., P2) to the AGF via a PPP NAS message, and the AGF may provide the PDU session establishment request to the AMF via NGAP uplink NAS transport. Based on receiving the PDU session establishment request, the AMF may provide an NSMF PDU session create request to the SMF, and the SMF may provide an N4 PFCP session create request to the UPF. The UPF may accept the N4 PFCP session create request and may provide an N4 PFCP session create response to the SMF. The SMF may provide an NSMF PDU session create response to the AMF, and the AMF may provide a PDU session establishment accept to the AGF via a PDU session resource setup request. The AGF may provide the PDU session establishment accept (e.g., and a session identifier D2) to the client device, and the client device may establish the second PDU session with the core network. Based on establishing the second PDU session, the client device may provide a PDU session establishment complete, via a PPP NAS message, to the AGF, and the AGF may provide a PDU session resource setup response to the AMF. The AMF may provide an NSMF PDU session modify request to the SMF, and the SMF may provide an N4 PFCP session modify request to the UPF. The UPF may provide an N4 PFCP session modify response to the SMF, and the SMF may provide an NSMF PDU session modify response to the AMF. The client device and the AGF may generate and transmit PPP keep alive messages in order to maintain the second PDU session (e.g., session D2). The AGF and the UPF may establish a GTP tunnel (e.g., T2) for the second PDU session.

FIG. 1L shows types of information utilized by the PPPoE and the PPP in implementations described herein. As shown, the PPPoE may include bits associated with a PPP session stage, an offer (PADO), an initiation (PADI), a session grant (PADG), a session credit response (PADC), a quality (PADQ), a request (PADR), a session confirmation (PADS), a terminate (PADT), a message (PADM), and a network (PADN).

As further shown FIG. 1L, the PPP may include bits associated with Internet protocol version 4 (IPv4), a bridging PDU, multi-link, Internet protocol version 6 (IPv6), 5G data, multi-protocol label switching (MPLS) unicast, MPLS multicast, a vendor-specific protocol (VSP), an Internet protocol control protocol, an IPv6 control protocol, a vendor-specific network control protocol (VSNCP), 5G access stratum, a link control protocol, a password authentication protocol, a vendor-specific authentication protocol (VSAP), a challenge handshake authentication protocol, and an extensible authentication protocol. In some implementations, the bits associated with 5G data and 5G access stratum may be newly provided in the PPP.

Figure 1M:
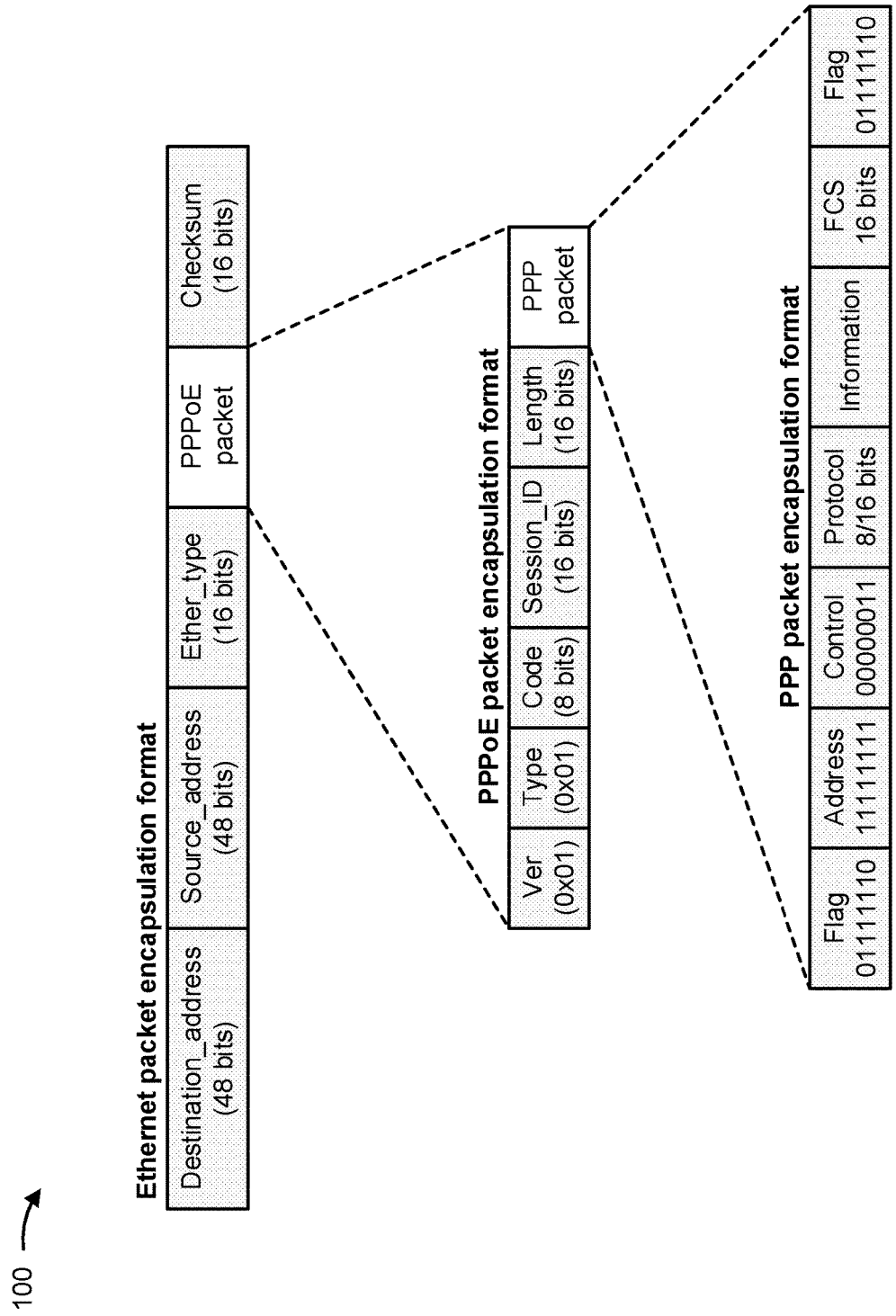

FIG. 1M shows information included in an Ethernet packet, a PPPoE packet of the Ethernet packet, and a PPP packet of the PPPoE packet that may be utilized in implementations described herein. For example, the Ethernet packet encapsulation format may include a destination address field, a source address field, an Ethernet type field, a PPPoE packet field, and a checksum field. The PPPoE packet encapsulation format may include a version field, a type field, a code field, a session identifier field, a length field, and a PPP packet field. The PPP packet encapsulation format may include a flag field, an address field, a control field, a protocol field, an information field, a frame check sequence (FCS) field, and another flag field.

FIG. 1N depicts a packet associated with 5G access stratum on PPPoE that may be utilized in implementations described herein. As shown, a first portion of the packet may include a destination media access control (MAC) address field, a source MAC address field, an Ethernet type field, and a PPPoE field that points to a second portion of the packet. The second portion of the packet may include a version field, a type field, a code field, a session identifier field, a length field, and a PPP field that points to a third portion of the packet. The third portion of the packet may include a protocol field (e.g., that includes newly provided information "0x80XX") and a payload field that points to a fourth portion of the packet. The fourth portion of the packet may include a 5G control field.

FIG. 1O shows types of 5G control NAS message formats for registration and deregistration of the client device, as utilized by the PPPoE and the PPP in implementations described herein. As shown in the left-hand table of FIG. 1O, the 5G NAS message format for registration may include a version field, a flags field, a message type=registration request field, an S-NSSAI[Octet 1] field, an S-NSSAI[Octet 2] field, an S-NSSAI[Octet 3] field, an S-NSSAI[Octet 4] field, a length of NAS PDU[Octet 1] field, a length of NAS PDU[Octet 2] field, a number of type length values (ATLVs) field, an ATLVs field, an NAS PDU[Octet 1] field, an NAS PDU[Octet 2] field, and an NAS PDU[Octet N] field. As shown in the right-hand table of FIG. 1O, the 5G NAS message format for deregistration may include a version field, an attribute type length value (ATLV) flag field (e.g., that is unset when "0" and set when "1"), a flags field, a message type=registration accept/complete/reject, deregistration request/accept field, a length of NAS PDU[Octet 1] field, a length of NAS PDU[Octet 2] field, an NAS PDU [Octet 1] field, an NAS PDU[Octet 2] field, and an NAS PDU[Octet N] field.

FIG. 1P shows types of 5G control NAS message formats for PDU session management by the client device, as utilized by the PPPoE and the PPP in implementations described herein. As shown in the left-hand table of FIG. 1P, the 5G NAS message format for PDU session management may include a version field, a flags field, a message type=PDU session establishment request/reject/complete, PDU session modification request/command/reject/complete, PDU session release request/command/reject/complete field, a PDU session-ID field, a procedure transaction ID (PTI) field, a length of NAS PDU[Octet 1] field, a length of NAS PDU[Octet 2] field, an NAS PDU[Octet 1] field, an NAS PDU[Octet 2] field, and an NAS PDU[Octet N] field. As shown in the right-hand table of FIG. 1P, the 5G NAS message format for PDU session establishment accept may include a version field, a flags field, a message type=PDU session establishment accept field, a PDU session-ID field, a procedure transaction ID (PTI) field, a 5G data session-ID[Octet 1] field, a 5G data session-ID[Octet 2] field, a length of NAS PDU[Octet 1] field, a length of NAS PDU[Octet 2] field, an NAS PDU[Octet 1] field, an NAS PDU[Octet 2] field, and an NAS PDU[Octet N] field.

FIG. 1Q shows types of 5G control NAS message formats for uplink and downlink transport, as utilized by the PPPoE and the PPP in implementations described herein. As shown in the left-hand table of FIG. 1Q, the 5G NAS message format for uplink and downlink transport may include a version field, a flags field, a message type=uplink (UL) transport/downlink (DL) transport field, a PDU session-ID field, a procedure transaction ID (PTI) field, a length of NAS PDU[Octet 1] field, a length of NAS PDU[Octet 2] field, an NAS PDU[Octet 1] field, an NAS PDU[Octet 2] field, and an NAS PDU[Octet N] field. As shown in the right-hand table of FIG. 1Q, the uplink transport may be utilized with a service request, a configuration update complete, an authentication response/failure, an identity response, a security mode complete/reject, a security protected 5G NAS message, a 5GMM status, a 5GSM status, and a notification response. The downlink transport may be utilized with a service accept/reject, a configuration update command, an authentication request/result/reject, an identity request, a security mode command, a security protected 5G NAS message, a 5GMM status, a 5GSM status, and a notification.

Figure 1R:
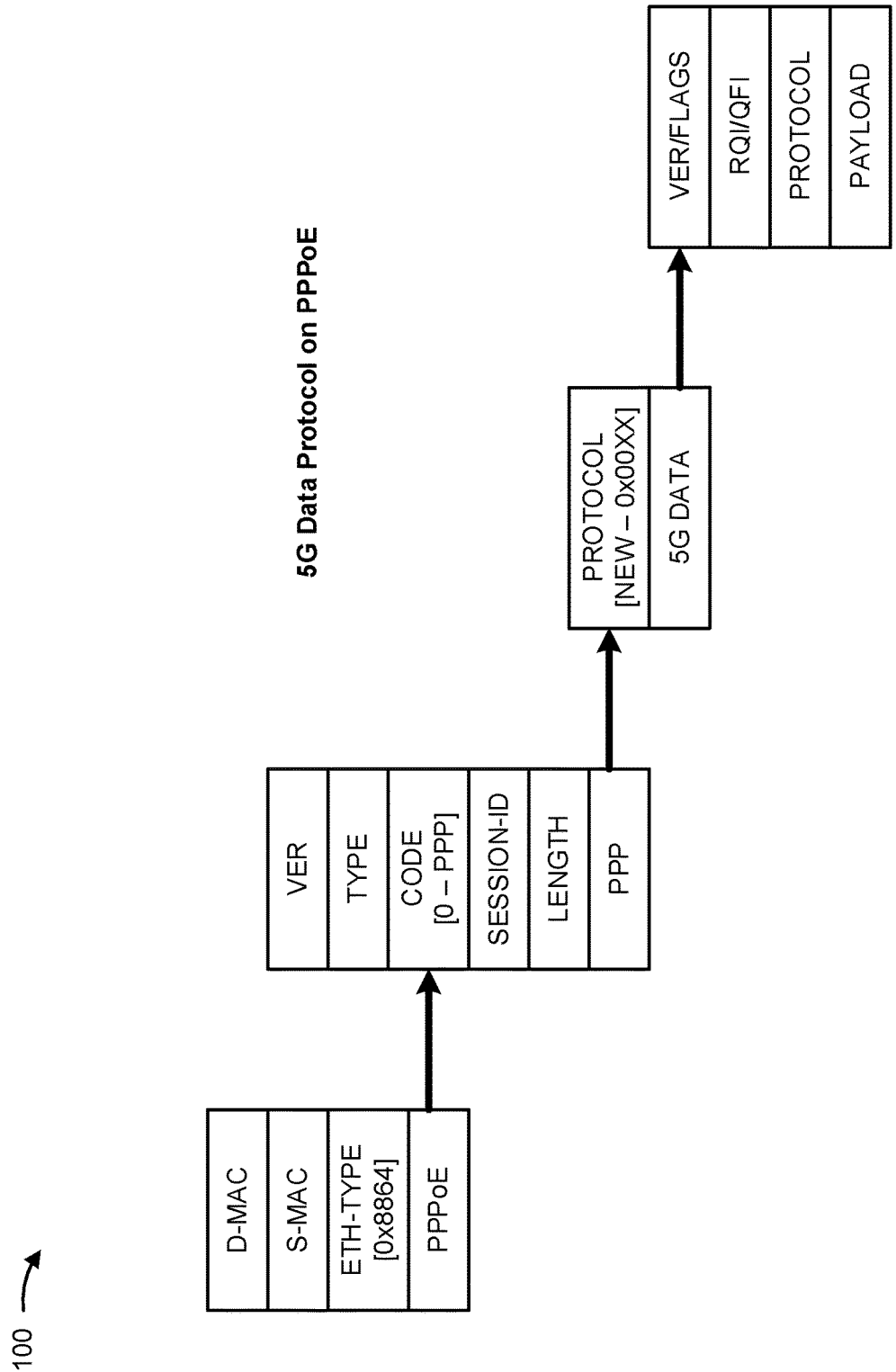

FIG. 1R depicts a packet associated with 5G data protocol on PPPoE that may be utilized in implementations described herein. As shown, a first portion of the packet may include a destination MAC address field, a source MAC address field, an Ethernet type field, and a PPPoE field that points to a second portion of the packet. The second portion of the packet may include a version field, a type field, a code field, a session identifier field, a length field, and a PPP field that points to a third portion of the packet. The third portion of the packet may include a protocol field (e.g., that includes newly provided information "0x00XX") and a 5G data field that points to a fourth portion of the packet. The fourth portion of the packet may include a version/flags field, a reflective quality of service (QoS) indicator (RQI)/QoS flow identifier (QFI) field, a protocol field, and payload field.

FIG. 1S shows a message format for a 5G data payload, as utilized by the PPPoE and the PPP in implementations described herein. As shown, the message format for the 5G data payload may include a version field, a reflective QoS field, a flags field, a QFI field, a PPP protocol[Octet 1] field, a PPP protocol[Octet 2] field, and a data field.

In this way, the client device utilizes a transport protocol to carry messages via wireline access to a 5G core network, thereby improving functioning of the 5G core network, the client device, and/or the like. For example, the client device may utilize PPPoE and PPP with a new set of protocol identifiers for control traffic and data traffic, and may utilize the PPPoE and PPP to handle multiple PDU sessions and thus provide different services to the multiple PDU sessions, as required. Furthermore, currently there does not exist a technique that utilizes a transport protocol to carry messages via wireline access to a 5G core network in the manner described herein. Finally, the client device conserves computing resources (e.g., processing resources, memory resources, communication resources, and/or the like), networking resources, and/or the like that would otherwise be wasted in performing deep packet inspection, determining 5G capability of a client device, modifying an access network, handling network attacks, and/or the like.

Furthermore, implementations described herein may provide a lightweight protocol since no other protocol is provided overhead to carry packets either for control, and may enable the control plane to allocate session identifiers for the data plane, which keeps the control plane in control of data sessions and prevents collisions and attacks. Implementations described herein may support 5G stringent scales and latency requirements, and may provide simple packet formats that can processed by data plane hardware and software.

As indicated above, FIGS. 1A-1S are provided merely as examples. Other examples may differ from what is described with regard to FIGS. 1A-1S.

Figure 2:
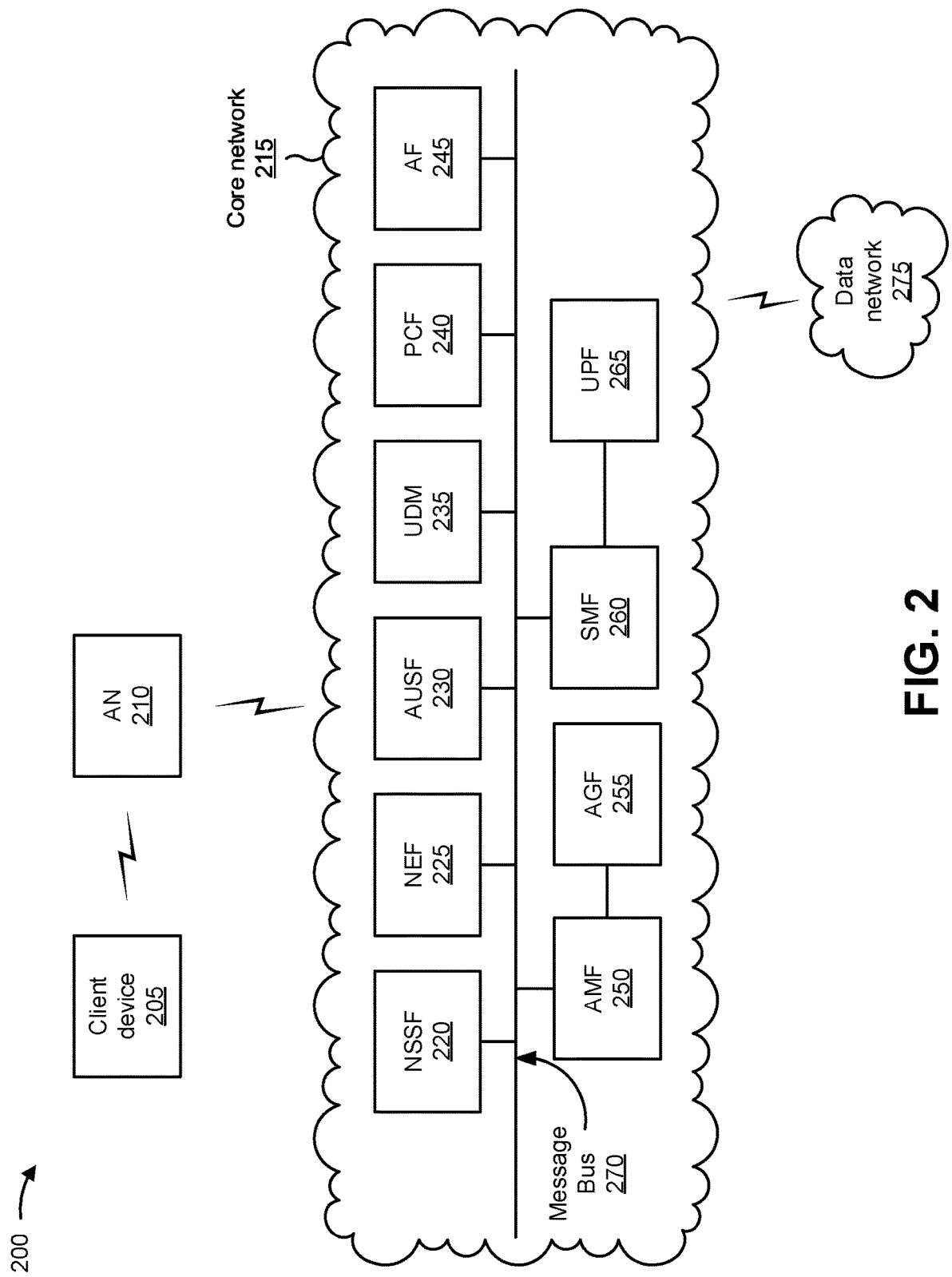
FIG. 2 is a diagram of an example environment in which systems and/or methods described herein may be implemented.

FIG. 2 is a diagram of an example environment 200 in which systems and/or methods described herein may be implemented. As shown in FIG. 2, example environment 200 may include client device 205, AN 210, core network 215, and a data network 275. Devices and/or networks of example environment 200 may interconnect via wired connections, wireless connections, or a combination of wired and wireless connections.

Client device 205 includes one or more devices capable of receiving, generating, storing, processing, and/or providing information, such as information described herein. For example, client device 205 may include a residential gateway, a user equipment, a network device (e.g., a label switching router (LSR), a label edge router (LER), an ingress router, an egress router, a provider router, a virtual router, a gateway, a switch, a firewall, a hub, a bridge, a reverse proxy, a proxy server, a cloud server, a data center server, a load balancer, and/or the like), or a similar type of device. In some implementations, client device 205 may receive network traffic from and/or may provide network traffic to core network 215, via AN 210.

AN 210 may include one or more nodes that are associated with a wireline connection to core network 215. AN 210 may include a central unit (CU) that includes a next generation (NG) interface connecting the CU to a core unit (e.g., a next gen core (NGC) unit), which may be a node of core network 215. AN 210 may transfer traffic between client device 205 and core network 215. In some implementations, AN 210 may perform scheduling and/or resource management for client device 205 covered by AN 210. In some implementations, AN 210 may be controlled or coordinated by a network controller, which may perform load balancing, network-level configuration, and/or the like. The network controller may communicate with AN 210 via a wireless or wireline backhaul. In some implementations, AN 210 may include a network controller, a self-organizing network (SON) module or component, or a similar module or component. In other words, AN 210 may perform network control, scheduling, and/or network management functions (e.g., for uplink, downlink, and/or sidelink communications of client device 205 covered by AN 210).

In some implementations, core network 215 may include an example functional architecture in which systems and/or methods described herein may be implemented. For example, core network 215 may include an example architecture of a fifth generation (5G) next generation (NG) core network included in a 5G wireless telecommunications system. While the example architecture of core network 215 shown in FIG. 2 may be an example of a service-based architecture, in some implementations, core network 215 may be implemented as a reference-point architecture.

As shown in FIG. 2, core network 215 may include a number of functional elements. The functional elements may include, for example, a network slice selection function (NSSF) 220, a network exposure function (NEF) 225, an authentication server function (AUSF) 230, a unified data management (UDM) component 235, a policy control function (PCF) 240, an application function (AF) 245, an access and mobility management function (AMF) 250, an access gateway function (AGF) 255, a session management function (SMF) 260, a user plane function (UPF) 265, and/or the like. These functional elements may be communicatively connected via a message bus 270. Each of the functional elements shown in FIG. 2 is implemented on one or more devices associated with a wireless telecommunications system. In some implementations, one or more of the functional elements may be implemented on physical devices, such as an access point, a base station, a gateway, and/or the like. In some implementations, one or more of the functional elements may be implemented on a computing device of a cloud computing environment.

NSSF 220 includes one or more devices that select network slice instances for client device 205. By providing network slicing, NSSF 220 allows an operator to deploy multiple substantially independent end-to-end networks potentially with the same infrastructure. In some implementations, each slice may be customized for different services.

NEF 225 includes one or more devices that support exposure of capabilities and/or events in the wireless telecommunications system to help other entities in the wireless telecommunications system discover network services.

AUSF 230 includes one or more devices that act as an authentication server and support the process of authenticating client device 205 in the wireless telecommunications system.

UDM 235 includes one or more devices that store user data and profiles in the wireless telecommunications system. UDM 235 may be used for fixed access, mobile access, and/or the like, in core network 215.

PCF 240 includes one or more devices that provide a policy framework that incorporates network slicing, roaming, packet processing, mobility management, and/or the like.

AF 245 includes one or more devices that support application influence on traffic routing, access to NEF 225, policy control, and/or the like.

AMF 250 includes one or more devices that act as a termination point for non-access stratum (NAS) signaling, mobility management, and/or the like.

AGF 255 includes one or more devices, between a wireline access infrastructure (e.g., AN 210) and wireless core network 215, that support residential gateways (e.g., client device 205) that include 5G NAS signaling and residential gateways that are purely wireline.

SMF 260 includes one or more devices that support the establishment, modification, and release of communications sessions in the wireless telecommunications system. For example, SMF 260 may configure traffic steering policies at UPF 265, enforce user equipment IP address allocation and policies, and/or the like.

UPF 265 includes one or more devices that serve as an anchor point for intraRAT and/or interRAT mobility. UPF 265 may apply rules to packets, such as rules pertaining to packet routing, traffic reporting, handling user plane QoS, and/or the like.

Message bus 270 represents a communication structure for communication among the functional elements. In other words, message bus 270 may permit communication between two or more functional elements.

Data network 275 includes one or more wired and/or wireless data networks. For example, data network 275 may include an IP Multimedia Subsystem (IMS), a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of example environment 200 may perform one or more functions described as being performed by another set of devices of example environment 200.

Figure 3:
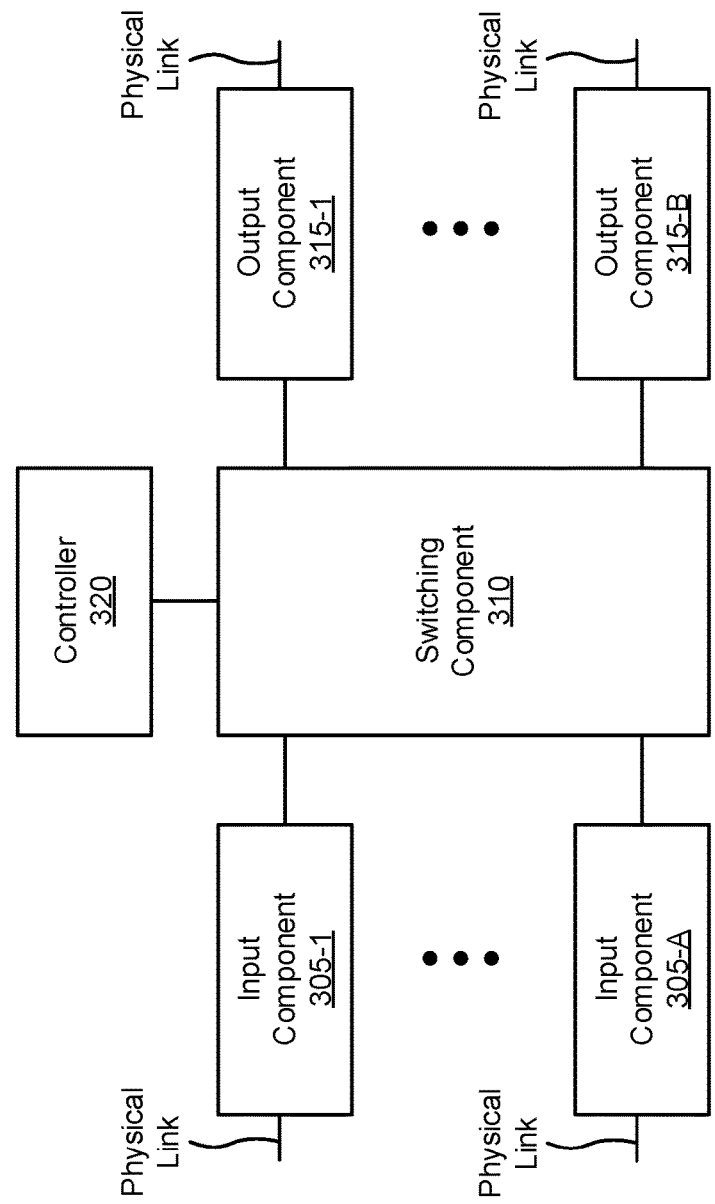
FIGS. 3 and 4 are diagrams of example components of one or more devices of FIG. 2.

FIG. 3 is a diagram of example components of a device 300. Device 300 may correspond to client device 205, NSSF 220, NEF 225, AUSF 230, UDM 235, PCF 240, AF 245, AMF 250, AGF 255, SMF 260, and/or UPF 265. In some implementations, client device 205, NSSF 220, NEF 225, AUSF 230, UDM 235, PCF 240, AF 245, AMF 250, AGF 255, SMF 260, and/or UPF 265 may include one or more devices 300 and/or one or more components of device 300. As shown in FIG. 3, device 300 may include one or more input components 305-1 through 305-A (A≥1) (hereinafter referred to collectively as input components 305, and individually as input component 305), a switching component 310, one or more output components 315-1 through 315-B (B≥1) (hereinafter referred to collectively as output components 315, and individually as output component 315), and a controller 320.

Input components 305 may be points of attachment for physical links and may be points of entry for incoming traffic, such as packets. Input component 305 may process incoming traffic, such as by performing data link layer encapsulation or decapsulation. In some implementations, input component 305 may send and/or receive packets. In some implementations, input component 305 may include an input line card that includes one or more packet processing components (e.g., in the form of integrated circuits), such as one or more interface cards (IFCs), packet forwarding components, line card controller components, input ports, processors, memories, and/or input queues. In some implementations, device 300 may include one or more input components 305.

Switching component 310 may interconnect input components 305 with output components 315. In some implementations, switching component 310 may be implemented via one or more crossbars, via busses, and/or with shared memories. The shared memories may act as temporary buffers to store packets from input components 305 before the packets are eventually scheduled for delivery to output components 315. In some implementations, switching component 310 may enable input components 305, output components 315, and/or controller 320 to communicate.

Output component 315 may store packets and may schedule packets for transmission on output physical links. Output component 315 may support data link layer encapsulation or decapsulation, and/or a variety of higher-level protocols. In some implementations, output component 315 may send packets and/or receive packets. In some implementations, output component 315 may include an output line card that includes one or more packet processing components (e.g., in the form of integrated circuits), such as one or more IFCs, packet forwarding components, line card controller components, output ports, processors, memories, and/or output queues. In some implementations, device 300 may include one or more output components 315. In some implementations, input component 305 and output component 315 may be implemented by the same set of components (e.g., and input/output component may be a combination of input component 305 and output component 315).

Controller 320 includes a processor in the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processor or processing component. The processor is implemented in hardware, firmware, and/or a combination of software and hardware. In some implementations, controller 320 may include one or more processors that can be programmed to perform a function.

In some implementations, controller 320 may include a random-access memory (RAM), a read only memory (ROM), and/or another type of dynamic or static storage device (e.g., a flash memory, a magnetic memory, an optical memory, and/or the like) that stores information and/or instructions for use by controller 320.

In some implementations, controller 320 may communicate with other devices, networks, and/or systems connected to device 300 to exchange information regarding network topology. Controller 320 may create routing tables based on the network topology information, create forwarding tables based on the routing tables, and forward the forwarding tables to input components 305 and/or output components 315. Input components 305 and/or output components 315 may use the forwarding tables to perform route lookups for incoming and/or outgoing packets. In some cases, controller 320 may create a session table based on information determined while initializing a link fault detection session and may forward the session table to input components 305 and/or output components 315.

Controller 320 may perform one or more processes described herein. Controller 320 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 320 from another computer-readable medium or from another device via a communication interface. When executed, software instructions stored in a memory and/or storage component associated with controller 320 may cause controller 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
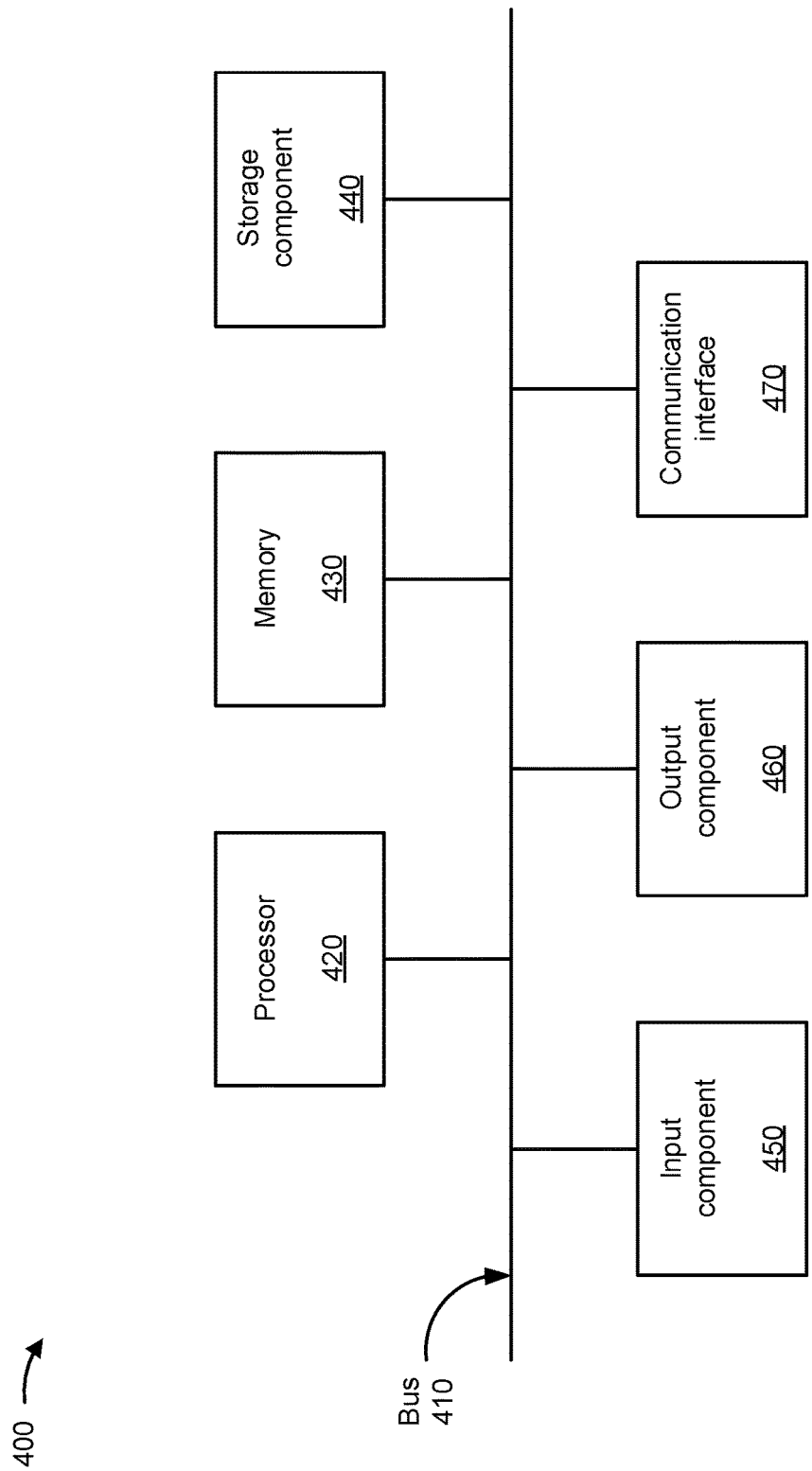

FIG. 4 is a diagram of example components of a device 400. Device 400 may correspond to client device 205, NSSF 220, NEF 225, AUSF 230, UDM 235, PCF 240, AF 245, AMF 250, AGF 255, SMF 260, and/or UPF 265. In some implementations, client device 205, NSSF 220, NEF 225, AUSF 230, UDM 235, PCF 240, AF 245, AMF 250, AGF 255, SMF 260, and/or UPF 265 may include one or more devices 400 and/or one or more components of device 400. As shown in FIG. 4, device 400 may include a bus 410, a processor 420, a memory 430, a storage component 440, an input component 450, an output component 460, and a communication interface 470.

Bus 410 includes a component that permits communication among the components of device 400. Processor 420 is implemented in hardware, firmware, or a combination of hardware and software. Processor 420 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 420 includes one or more processors capable of being programmed to perform a function. Memory 430 includes a random-access memory (RAM), a read only memory (ROM), and/or another type of dynamic or static storage device (e.g., a flash memory, a magnetic memory, and/or an optical memory) that stores information and/or instructions for use by processor 420.

Storage component 440 stores information and/or software related to the operation and use of device 400. For example, storage component 440 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 450 includes a component that permits device 400 to receive information, such as via user input (e.g., a touch screen display, a keyboard, a keypad, a mouse, a button, a switch, and/or a microphone). Additionally, or alternatively, input component 450 may include a sensor for sensing information (e.g., a global positioning system (GPS) component, an accelerometer, a gyroscope, and/or an actuator). Output component 460 includes a component that provides output information from device 400 (e.g., a display, a speaker, and/or one or more light-emitting diodes (LEDs)).

Communication interface 470 includes a transceiver-like component (e.g., a transceiver and/or a separate receiver and transmitter) that enables device 400 to communicate with other devices, such as via a wired connection, a wireless connection, or a combination of wired and wireless connections. Communication interface 470 may permit device 400 to receive information from another device and/or provide information to another device. For example, communication interface 470 may include an Ethernet interface, an optical interface, a coaxial interface, an infrared interface, a radio frequency (RF) interface, a universal serial bus (USB) interface, a Wi-Fi interface, a cellular network interface, and/or the like.

Device 400 may perform one or more processes described herein. Device 400 may perform these processes based on processor 420 executing software instructions stored by a non-transitory computer-readable medium, such as memory 430 and/or storage component 440.

Software instructions may be read into memory 430 and/or storage component 440 from another computer-readable medium or from another device via communication interface 470. When executed, software instructions stored in memory 430 and/or storage component 440 may cause processor 420 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
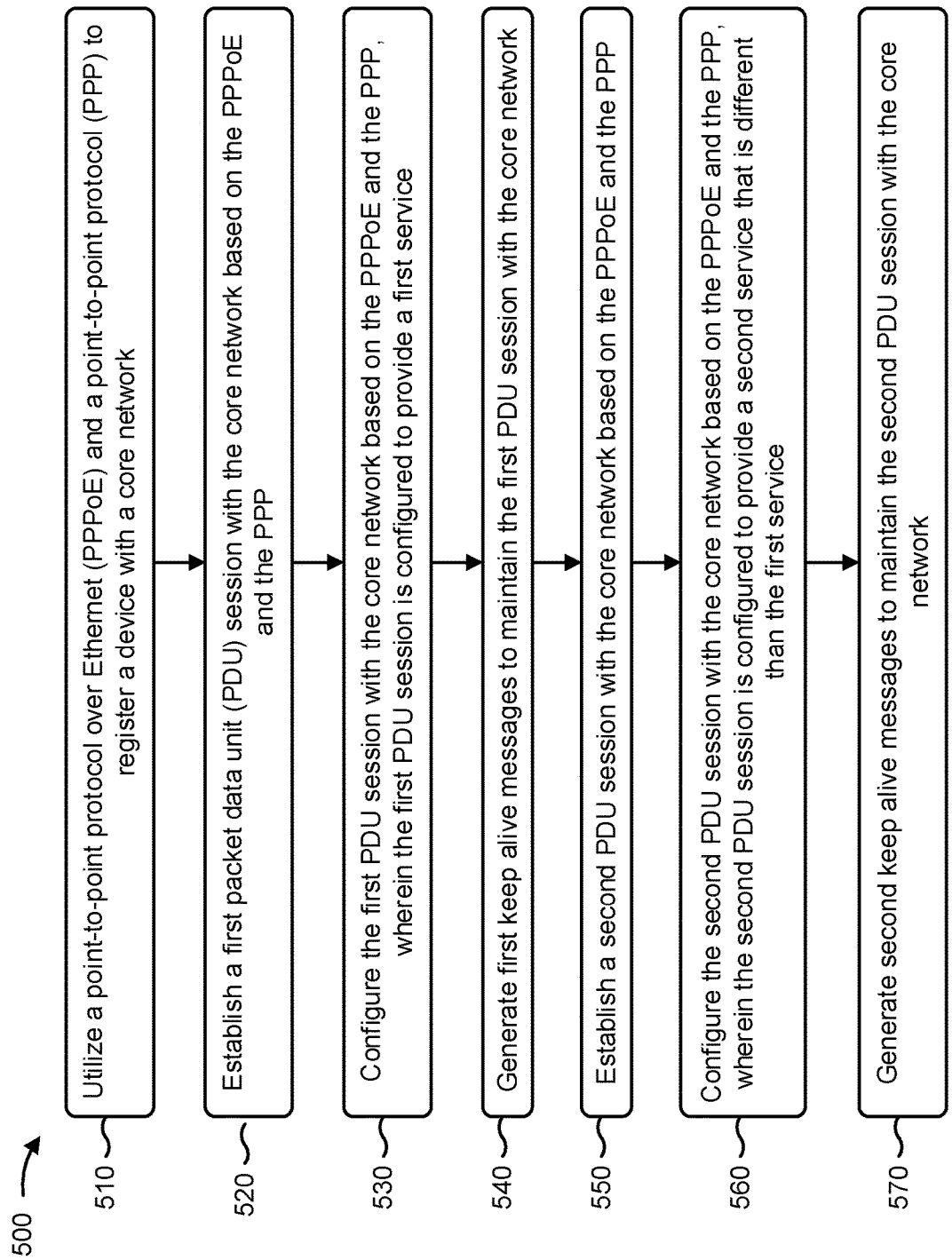

FIG. 5 is a flow chart of an example process 500 for utilizing a transport protocol for 5G client devices to carry messages on wireline access. In some implementations, one or more process blocks of FIG. 5 may be performed by a device (e.g., client device 205). In some implementations, one or more process blocks of FIG. 5 may be performed by another device or a group of devices separate from or including the device, such as one or more devices of a core network (e.g., core network 215).

As shown in FIG. 5, process 500 may include utilizing a point-to-point protocol over Ethernet (PPPoE) and a point-to-point protocol (PPP) to register the device with a core network (block 510). For example, the device (e.g., using input component 305, switching component 310, output component 315, controller 320, processor 420, communication interface 470, and/or the like) may utilize a PPPoE and a PPP to register the device with a core network, as described above.

As further shown in FIG. 5, process 500 may include establishing a first packet data unit (PDU) session with the core network based on the PPPoE and the PPP (block 520). For example, the device (e.g., using input component 305, switching component 310, output component 315, controller 320, processor 420, memory 430, communication interface 470, and/or the like) may establish a first PDU session with the core network based on the PPPoE and the PPP, as described above.

As further shown in FIG. 5, process 500 may include configuring the first PDU session with the core network based on the PPPoE and the PPP, wherein the first PDU session is configured to provide a first service (block 530). For example, the device (e.g., using input component 305, switching component 310, output component 315, controller 320, processor 420, storage component 440, communication interface 470, and/or the like) may configure the first PDU session with the core network based on the PPPoE and the PPP, as described above. In some implementations, the first PDU session may be configured to provide a first service.

As further shown in FIG. 5, process 500 may include generating first keep alive messages to maintain the first PDU session with the core network (block 540). For example, the device (e.g., using switching component 310, output component 315, controller 320, processor 420, communication interface 470, and/or the like) may generate first keep alive messages to maintain the first PDU session with the core network, as described above.

As further shown in FIG. 5, process 500 may include establishing a second PDU session with the core network based on the PPPoE and the PPP (block 550). For example, the device (e.g., using input component 305, switching component 310, output component 315, controller 320, processor 420, memory 430, communication interface 470, and/or the like) may establish a second PDU session with the core network based on the PPPoE and the PPP, as described above.

As further shown in FIG. 5, process 500 may include configuring the second PDU session with the core network based on the PPPoE and the PPP, wherein the second PDU session is configured to provide a second service that is different than the first service (block 560). For example, the device (e.g., using input component 305, switching component 310, output component 315, controller 320, processor 420, storage component 440, communication interface 470, and/or the like) may configure the second PDU session with the core network based on the PPPoE and the PPP, as described above. In some implementations, the second PDU session is configured to provide a second service that is different than the first service.

As further shown in FIG. 5, process 500 may include generating second keep alive messages to maintain the second PDU session with the core network (block 570). For example, the device (e.g., using switching component 310, output component 315, controller 320, processor 420, memory 430, communication interface 470, and/or the like) may generate second keep alive messages to maintain the second PDU session with the core network, as described above.

Process 500 may include additional implementations, such as any single implementation or any combination of implementations described below and/or in connection with one or more other processes described elsewhere herein.

In a first implementation, process 500 may include modifying one of the first PDU session or the second PDU session based on the PPPoE and the PPP.

In a second implementation, alone or in combination with the first implementation, modifying one of the first PDU session or the second PDU session may include providing a PPP NAS PDU session modification request to the core network; receiving a PPP NAS PDU session modification command from the core network based on providing the PPP NAS PDU session modification request; modifying the first PDU session or the second PDU session based on executing the PPP NAS PDU session modification command; and providing a PPP NAS PDU session modification complete indication to the core network based on executing the PPP NAS PDU session modification command.

In a third implementation, alone or in combination with one or more of the first and second implementations, process 500 may include releasing one of the first PDU session or the second PDU session based on the PPPoE and the PPP.

In a fourth implementation, alone or in combination with one or more of the first through third implementations, process 500 may include releasing the first PDU session and the second PDU session based on the PPPoE and the PPP, and after a period of time; and deregistering the device with the core network based on releasing the first PDU session and the second PDU session.

In a fifth implementation, alone or in combination with one or more of the first through fourth implementations, releasing the first PDU session and the second PDU session may include providing a PPP NAS first PDU session release request to the core network; receiving a PPP NAS first PDU session release command from the core network based on providing the PPP NAS first PDU session release request; releasing the first PDU session based on executing the PPP NAS first PDU session release command; providing a PPP NAS first PDU session release complete indication to the core network based on executing the PPP NAS first PDU session release command; providing a PPP NAS second PDU session release request to the core network; receiving a PPP NAS second PDU session release command from the core network based on providing the PPP NAS second PDU session release request; releasing the second PDU session based on executing the PPP NAS second PDU session release command; and providing a PPP NAS second PDU session release complete indication to the core network based on executing the PPP NAS second PDU session release command.

In a sixth implementation, alone or in combination with one or more of the first through fifth implementations, deregistering the device with the core network may include providing a PPP NAS deregistration request to the core network; receiving a PPP NAS deregistration accept message from the core network based on providing the PPP NAS deregistration request; receiving another PPP NAS deregistration request from the core network; and providing another PPP NAS deregistration accept message to the core network based on receiving the other PPP NAS deregistration request.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
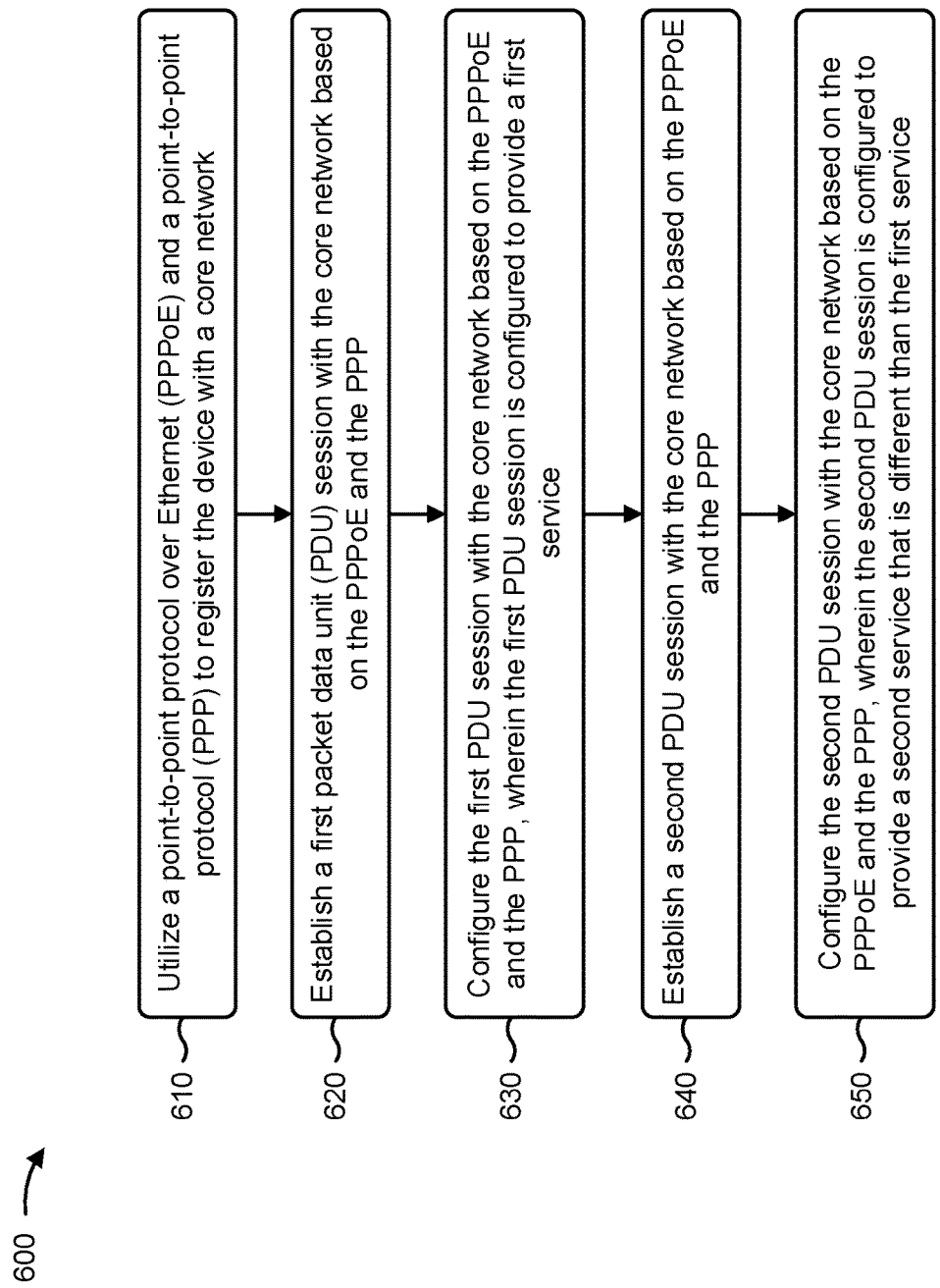

FIG. 6 is a flow chart of an example process 600 for utilizing a transport protocol for 5G client devices to carry messages on wireline access. In some implementations, one or more process blocks of FIG. 6 may be performed by a device (e.g., client device 205). In some implementations, one or more process blocks of FIG. 6 may be performed by another device or a group of devices separate from or including the device, such as one or more devices of a core network (e.g., core network 215).

As shown in FIG. 6, process 600 may include utilizing a PPPoE and a PPP to register the device with a core network (block 610). For example, the device (e.g., using input component 305, switching component 310, output component 315, controller 320, processor 420, memory 430, communication interface 470, and/or the like) may utilize a PPPoE and a PPP to register the device with a core network, as described above.

As further shown in FIG. 6, process 600 may include establishing a first PDU session with the core network based on the PPPoE and the PPP (block 620). For example, the device (e.g., using input component 305, switching component 310, output component 315, controller 320, processor 420, storage component 440, communication interface 470, and/or the like) may establish a first PDU session with the core network based on the PPPoE and the PPP, as described above.

As further shown in FIG. 6, process 600 may include configuring the first PDU session with the core network based on the PPPoE and the PPP, wherein the first PDU session is configured to provide a first service (block 630). For example, the device (e.g., using input component 305, switching component 310, output component 315, controller 320, processor 420, memory 430, communication interface 470, and/or the like) may configure the first PDU session with the core network based on the PPPoE and the PPP, as described above. In some implementations, the first PDU session is configured to provide a first service.

As further shown in FIG. 6, process 600 may include establishing a second PDU session with the core network based on the PPPoE and the PPP (block 640). For example, the device (e.g., using input component 305, switching component 310, output component 315, controller 320, processor 420, storage component 440, communication interface 470, and/or the like) may establish a second PDU session with the core network based on the PPPoE and the PPP, as described above.

As further shown in FIG. 6, process 600 may include configuring the second PDU session with the core network based on the PPPoE and the PPP, wherein the second PDU session is configured to provide a second service that is different than the first service (block 650). For example, the device (e.g., using input component 305, switching component 310, output component 315, controller 320, processor 420, memory 430, storage component 440, communication interface 470, and/or the like) may configure the second PDU session with the core network based on the PPPoE and the PPP, as described above. In some implementations, the second PDU session is configured to provide a second service that is different than the first service.

Process 600 may include additional implementations, such as any single implementation or any combination of implementations described below and/or in connection with one or more other processes described elsewhere herein.

In a first implementation, the device may include a residential gateway or a user equipment.

In a second implementation, alone or in combination with the first implementation, utilizing the PPPoE and the PPP to register the device with the core network may include providing a PPP NAS registration request to the core network; receiving a PPP NAS downlink transport identity request from the core network based on providing the PPP NAS registration request; providing a PPP NAS uplink transport identity response to the core network based on the PPP NAS downlink transport identity request, wherein the PPP NAS uplink transport identity response includes an identity of the device; receiving a PPP NAS downlink transport authentication request from the core network based on providing the PPP NAS uplink transport identity response; providing a PPP NAS uplink transport authentication response to the core network based on the PPP NAS downlink transport authentication request, wherein the PPP NAS uplink transport authentication response includes authentication credentials of the device; receiving a PPP NAS downlink transport security mode command from the core network based on providing the PPP NAS uplink transport authentication response; providing, to the core network, a PPP NAS uplink transport indication of execution of the security mode command based on executing the PPP NAS downlink transport security mode command; and receiving, from the core network, an indication that the device is registered with the core network based on providing the PPP NAS uplink transport indication of execution of the security mode command.

In a third implementation, alone or in combination with one or more of the first and second implementations, establishing the first PDU session with the core network may include providing a PPP NAS first PDU session establishment request to the core network; receiving a PPP NAS first PDU session accept message from the core network based on providing the PPP NAS first PDU session establishment request, wherein the PPP NAS first PDU session accept message includes a first session identifier for the first PDU session; establishing the first PDU session with the core network based on receiving the PPP NAS first PDU session accept message from the core network; and providing a PPP NAS first PDU session establishment complete indication to the core network based on establishing the first PDU session with the core network.

In a fourth implementation, alone or in combination with one or more of the first through third implementations, establishing the second PDU session with the core network may include providing a PPP NAS second PDU session establishment request to the core network; receiving a PPP NAS second PDU session accept message from the core network based on providing the PPP NAS second PDU session establishment request, wherein the PPP NAS second PDU session accept message includes a second session identifier for the second PDU session; establishing the second PDU session with the core network based on receiving the PPP NAS second PDU session accept message from the core network; and providing a PPP NAS second PDU session establishment complete indication to the core network based on establishing the second PDU session with the core network.

In a fifth implementation, alone or in combination with one or more of the first through fourth implementations, process 600 may include causing a first tunnel to be created in the core network based on establishing the first PDU session with the core network; and causing a second tunnel to be created in the core network based on establishing the second PDU session with the core network.

In a sixth implementation, alone or in combination with one or more of the first through fifth implementations, the core network may include a fifth generation core network.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

FIG. 7 is a flow chart of an example process 700 for utilizing a transport protocol for 5G client devices to carry messages on wireline access. In some implementations, one or more process blocks of FIG. 7 may be performed by a device (e.g., client device 205). In some implementations, one or more process blocks of FIG. 7 may be performed by another device or a group of devices separate from or including the device, such as one or more devices of a core network (e.g., core network 215).

As shown in FIG. 7, process 700 may include utilizing a PPPoE and a PPP to register the device with a core network (block 710). For example, the device (e.g., using input component 305, switching component 310, output component 315, controller 320, processor 420, memory 430, communication interface 470, and/or the like) may utilize a PPPoE and a PPP to register the device with a core network, as described above.

As further shown in FIG. 7, process 700 may include establishing a first PDU session with the core network based on the PPPoE and the PPP (block 720). For example, the device (e.g., using input component 305, switching component 310, output component 315, controller 320, processor 420, storage component 440, communication interface 470, and/or the like) may establish a first PDU session with the core network based on the PPPoE and the PPP, as described above.

As further shown in FIG. 7, process 700 may include configuring the first PDU session with the core network based on the PPPoE and the PPP, wherein the first PDU session is configured to provide a first service (block 730). For example, the device (e.g., using input component 305, switching component 310, output component 315, controller 320, processor 420, memory 430, storage component 440, communication interface 470, and/or the like) may configure the first PDU session with the core network based on the PPPoE and the PPP, as described above. In some implementations, the first PDU session is configured to provide a first service.

As further shown in FIG. 7, process 700 may include transmitting first keep alive messages to maintain the first PDU session with the core network (block 740). For example, the device (e.g., using switching component 310, output component 315, controller 320, processor 420, memory 430, communication interface 470, and/or the like) may transmit first keep alive messages to maintain the first PDU session with the core network, as described above.

Process 700 may include additional implementations, such as any single implementation or any combination of implementations described below and/or in connection with one or more other processes described elsewhere herein.

In a first implementation, process 700 may include establishing a second PDU session with the core network based on the PPPoE and the PPP; configuring the second PDU session with the core network based on the PPPoE and the PPP, wherein the second PDU session may be configured to provide a second service that is different than the first service; and transmitting second keep alive messages to maintain the second PDU session with the core network.

In a second implementation, alone or in combination with the first implementation, process 700 may include modifying the first PDU session based on the PPPoE and the PPP.

In a third implementation, alone or in combination with one or more of the first and second implementations, process 700 may include releasing the first PDU session based on the PPPoE and the PPP and after a period of time, and deregistering the device with the core network based on releasing the first PDU session.

In a fourth implementation, alone or in combination with one or more of the first through third implementations, utilizing the PPPoE and the PPP to register the device with the core network may include providing a PPP NAS registration request to the core network; receiving a PPP NAS downlink transport identity request from the core network based on providing the PPP NAS registration request; providing a PPP NAS uplink transport identity response to the core network based on the PPP NAS downlink transport identity request, wherein the PPP NAS uplink transport identity response includes an identity of the device; receiving a PPP NAS downlink transport authentication request from the core network based on providing the PPP NAS uplink transport identity response; providing a PPP NAS uplink transport authentication response to the core network based on the PPP NAS downlink transport authentication request, wherein the PPP NAS uplink transport authentication response includes authentication credentials of the device; receiving a PPP NAS downlink transport security mode command from the core network based on providing the PPP NAS uplink transport authentication response; providing, to the core network, a PPP NAS uplink transport indication of execution of the security mode command based on executing the PPP NAS downlink transport security mode command; and receiving, from the core network, an indication that the device is registered with the core network based on providing the PPP NAS uplink transport indication of execution of the security mode command.

In a fifth implementation, alone or in combination with one or more of the first through fourth implementations, establishing the first PDU session with the core network may include providing a PPP NAS first PDU session establishment request to the core network; receiving a PPP NAS first PDU session accept message from the core network based on providing the PPP NAS first PDU session establishment request, wherein the PPP NAS first PDU session accept message includes a first session identifier for the first PDU session; establishing the first PDU session with the core network based on receiving the PPP NAS first PDU session accept message from the core network; and providing a PPP NAS first PDU session establishment complete indication to the core network based on establishing the first PDU session with the core network.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   utilizing, by a device, a transport protocol to register the device with a core network;
   establishing, by the device, a first packet data unit (PDU) session with the core network based on the transport protocol,
      wherein the first PDU session is configured to provide a first service;
   transmitting, by the device, first messages to maintain the first PDU session with the core network;
   establishing, by the device and during the first PDU session, a second PDU session with the core network based on the transport protocol,
      wherein the second PDU session is configured to provide a second service that is different than the first service; and
   transmitting, by the device, second messages to maintain the second PDU session with the core network.

2. The method of claim 1, further comprising:
   modifying one of the first PDU session or the second PDU session based on the transport protocol.

3. The method of claim 2, wherein modifying the one of the first PDU session or the second PDU session comprises:
   providing a PDU session modification request to the core network;
   receiving a PDU session modification command from the core network based on providing the PDU session modification request;
   modifying the first PDU session or the second PDU session based on executing the PDU session modification command; and
   providing a PDU session modification complete indication to the core network based on executing the PDU session modification command.

4. The method of claim 1, further comprising:
   releasing one of the first PDU session or the second PDU session based on the transport protocol.

5. The method of claim 4, wherein releasing the one of the first PDU session or the second PDU session comprises:
   providing a first PDU session release request to the core network;
   receiving a first PDU session release command from the core network based on providing the first PDU session release request;

releasing the first PDU session based on executing the first PDU session release command;
providing a first PDU session release complete indication to the core network based on executing the first PDU session release command;
providing a second PDU session release request to the core network;
receiving a second PDU session release command from the core network based on providing the second PDU session release request;
releasing the second PDU session based on executing the second PDU session release command; and
providing a second PDU session release complete indication to the core network based on executing the second PDU session release command.

6. The method of claim 1, further comprising:
releasing the first PDU session; and
deregistering the device with the core network based on releasing the first PDU session.

7. The method of claim 6, wherein deregistering the device with the core network comprises:
providing a deregistration request to the core network; and
receiving a deregistration accept message from the core network based on providing the deregistration request.

8. A device, comprising:
one or more memories; and
one or more processors to:
utilize a transport protocol to register the device with a core network;
establish a first packet data unit (PDU) session with the core network based on the transport protocol,
wherein the first PDU session is configured to provide a first service;
establish, during the first PDU session, a second PDU session with the core network based on the transport protocol,
wherein the second PDU session is configured to provide a second service that is different than the first service; and
transmit second messages to maintain the second PDU session with the core network.

9. The device of claim 8, wherein the device includes one of:
a residential gateway, or
a user equipment.

10. The device of claim 8, wherein the transport protocol includes at least one of a point-to-point protocol over Ethernet (PPPOE) or a point-to-point protocol (PPP).

11. The device of claim 8, wherein the one or more processors, when establishing the first PDU session with the core network, are to:
provide a first PDU session establishment request to the core network;
receive a first PDU session accept message from the core network based on providing the first PDU session establishment request,
wherein the first PDU session accept message includes a first session identifier for the first PDU session;
establish the first PDU session with the core network based on receiving the first PDU session accept message from the core network; and
provide a first PDU session establishment complete indication to the core network based on establishing the first PDU session with the core network.

12. The device of claim 8, wherein the one or more processors, when establishing the second PDU session with the core network, are to:
provide a second PDU session establishment request to the core network;
receive a second PDU session accept message from the core network based on providing the second PDU session establishment request,
wherein the second PDU session accept message includes a second session identifier for the second PDU session;
establish the second PDU session with the core network based on receiving the second PDU session accept message from the core network; and
provide a second PDU session establishment complete indication to the core network based on establishing the second PDU session with the core network.

13. The device of claim 8, wherein the one or more processors are further to:
release the first PDU session; and
deregister the device with the core network based on releasing the first PDU session.

14. The device of claim 8, wherein the core network includes a fifth generation core network.

15. A non-transitory computer-readable medium storing instructions, the instructions comprising:
one or more instructions that, when executed by one or more processors of a device, cause the one or more processors to:
utilize a transport protocol to register the device with a core network;
establish a first packet data unit (PDU) session with the core network based on the transport protocol,
wherein the first PDU session is configured to provide a first service;
transmit first messages to maintain the first PDU session with the core network;
establish, during the first PDU session, a second PDU session with the core network based on the transport protocol,
wherein the second PDU session is configured to provide a second service that is different than the first service; and
transmit second messages to maintain the second PDU session with the core network.

16. The non-transitory computer-readable medium of claim 15, wherein the instructions further comprise:
one or more instructions that, when executed by the one or more processors, cause the one or more processors to:
release the first PDU session; and
deregister the device with the core network based on releasing the first PDU session.

17. The non-transitory computer-readable medium of claim 15, wherein the instructions further comprise:
one or more instructions that, when executed by the one or more processors, cause the one or more processors to:
modify the first PDU session based on the transport protocol.

18. The non-transitory computer-readable medium of claim 15, wherein the device includes a residential gateway or a user equipment.

19. The non-transitory computer-readable medium of claim 15, wherein the transport protocol includes at least one of a point-to-point protocol over Ethernet (PPPOE) or a point-to-point protocol (PPP).

20. The non-transitory computer-readable medium of claim 15, wherein the one or more instructions, that cause the one or more processors to establish the first PDU session with the core network, cause the one or more processors to:
- provide a first PDU session establishment request to the core network;
- receive a first PDU session accept message from the core network based on providing the first PDU session establishment request,
    - wherein the first PDU session accept message includes a first session identifier for the first PDU session;
- establish the first PDU session with the core network based on receiving the first PDU session accept message from the core network; and
- provide a first PDU session establishment complete indication to the core network based on establishing the first PDU session with the core network.

\* \* \* \* \*